(12) United States Patent
Watanabe

(10) Patent No.: US 9,727,548 B2
(45) Date of Patent: Aug. 8, 2017

(54) CLOUD SERVICE FOR HOSPITAL FORM AUTO FILLING SYSTEM

(71) Applicant: Kaoru Watanabe, Sunnyvale, CA (US)

(72) Inventor: Kaoru Watanabe, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 73 days.

(21) Appl. No.: 14/194,353

(22) Filed: Feb. 28, 2014

(65) Prior Publication Data

US 2015/0248392 A1 Sep. 3, 2015

(51) Int. Cl.
| | | |
|---|---|---|
| G06F 3/00 | (2006.01) | |
| G06F 17/24 | (2006.01) | |
| G06F 17/30 | (2006.01) | |
| G06F 17/27 | (2006.01) | |

(52) U.S. Cl.
CPC ........ *G06F 17/243* (2013.01); *G06F 17/2705* (2013.01); *G06F 17/30011* (2013.01); *G06F 17/30876* (2013.01)

(58) Field of Classification Search
CPC ............... G06F 17/243; G06F 17/2705; G06F 17/30011; G06F 17/30876
See application file for complete search history.

(56) References Cited

U.S. PATENT DOCUMENTS

| | | | |
|---|---|---|---|
| 5,794,259 A | 8/1998 | Kikinis | |
| 7,203,699 B2 | 4/2007 | Bellamy | |
| 7,669,116 B2 | 2/2010 | Lopata | |
| 2002/0194007 A1 | 12/2002 | Earnshaw | |
| 2003/0126156 A1 | 7/2003 | Stoltenberg | |
| 2005/0282530 A1 | 12/2005 | Raff | |
| 2006/0159345 A1 | 7/2006 | Clary | |
| 2008/0184102 A1 | 7/2008 | Selig | |
| 2008/0235567 A1 | 9/2008 | Raj | |
| 2008/0243541 A1* | 10/2008 | Felton | G06F 19/363 705/2 |
| 2009/0070142 A1 | 3/2009 | Morita et al. | |
| 2009/0206992 A1 | 8/2009 | Giobbi et al. | |
| 2009/0248537 A1 | 10/2009 | Sarkeshik | |

(Continued)

OTHER PUBLICATIONS

European Patent Office, "Search Report" in application No. 15156048.9-1955, dated Jul. 7, 2015, 9 pages.

(Continued)

*Primary Examiner* — Kyle Stork
(74) *Attorney, Agent, or Firm* — Hickman Palermo Becker Bingham LLP; Malgorzata A. Kulczycka

(57) ABSTRACT

Techniques are provided for acquiring form document data representing a form document; parsing the form document data of the form document to extract one or more data information components; identifying a database that stores one or more text strings in association with one or more data text labels; and generating filled form document data of a filled form document. The generating is performed by: for each data information component, of the one or more data information components of the form document, having an associated data text label: based on, at least in part, the associated data text label, retrieving, from the database, a text string that is associated with the data text label; and inserting the text string into a data text field of the data information component at the data text field location.

20 Claims, 16 Drawing Sheets

(56) References Cited

U.S. PATENT DOCUMENTS

| | | |
|---|---|---|
| 2010/0121642 A1 | 5/2010 | Hori |
| 2011/0249905 A1 | 10/2011 | Singh |
| 2011/0271173 A1 | 11/2011 | Ait-Mokhtar et al. |
| 2012/0185265 A1 | 7/2012 | Kochhar |
| 2012/0303455 A1 | 11/2012 | Busch |
| 2014/0164119 A1* | 6/2014 | Narayanan ............ G06Q 20/387 705/14.58 |
| 2014/0188873 A1* | 7/2014 | Chang ................ G06F 17/30241 707/736 |
| 2014/0200961 A1 | 7/2014 | Folks |
| 2015/0198938 A1* | 7/2015 | Steele .................... G05B 15/02 700/275 |
| 2015/0248391 A1 | 9/2015 | Watanabe et al. |
| 2015/0248393 A1 | 9/2015 | Watanabe et al. |

OTHER PUBLICATIONS

U.S. Appl. No. 14/194,336, filed Feb. 28, 2014, Office Action, dated Feb. 18, 2016.
European Paten Office, "Search Report" in application No. 15156048.9-1871, dated Mar. 28, 2017, 11 pages.
Watanabe, U.S. Appl. No. 14/194,336, filed Mar. 28, 2014, Office Action, dated Feb. 13, 2017.

* cited by examiner

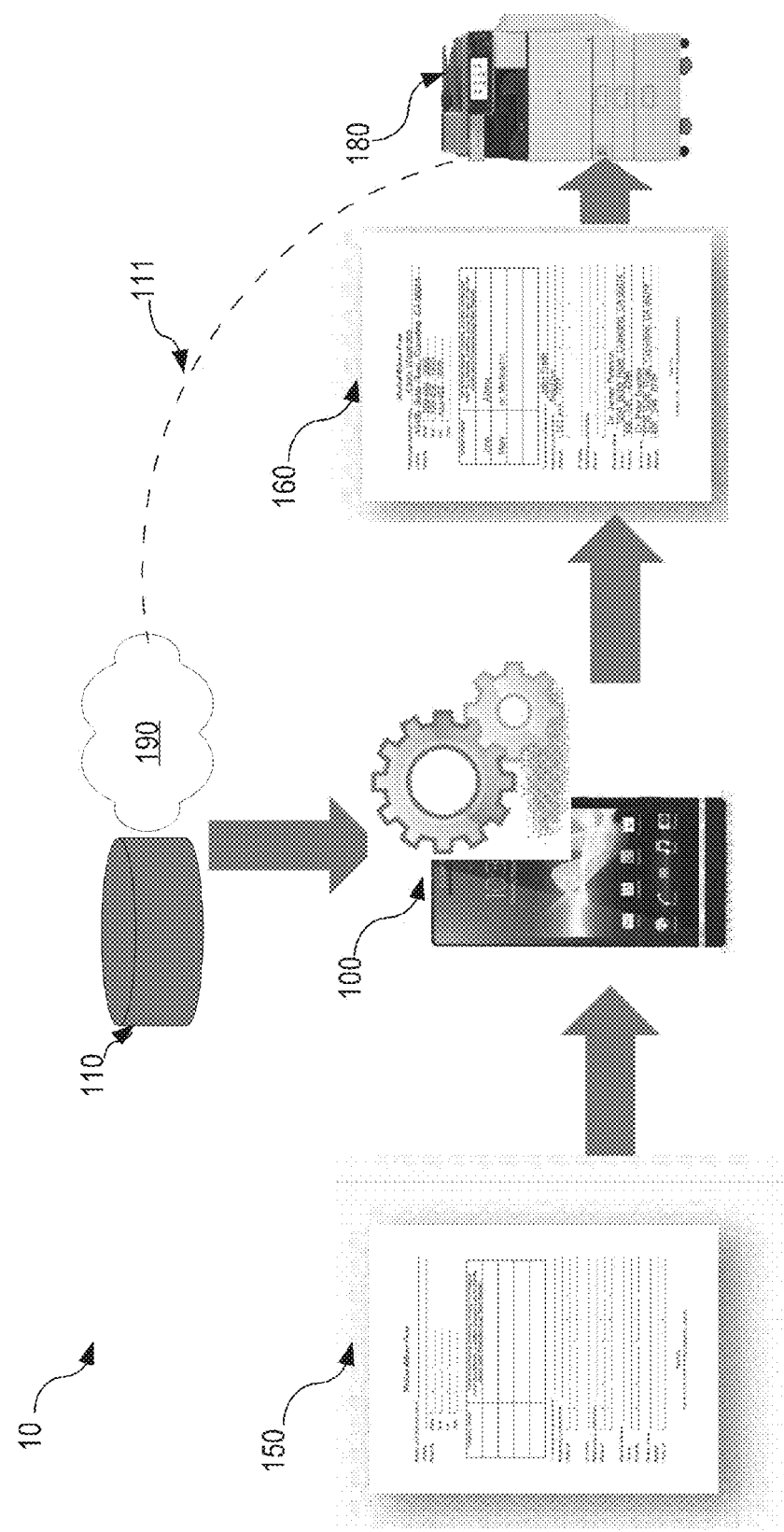

CLOUD SERVICE FOR HOSPITAL FORM AUTO FILLING SYSTEM

RELATED APPLICATION DATA

This application is related to U.S. patent application Ser. No. 14/194,336 entitled "Form Auto-Filling Using a Mobile Device", filed Feb. 28, 2014, and U.S. patent application Ser. No. 14/194,365 entitled "Data Management For Hospital Form Auto Filling System", filed Feb. 28, 2014, the contents all of which are incorporated by reference in their entirety for all purposes as if fully set forth herein.

FIELD

Embodiments relate generally to an approach for form auto-fill using a mobile device and a cloud service system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many service providers maintain computerized systems for tracking services provided to customers. The computerized systems usually include databases for storing information related to customers, services, and invoices. Some of the information may be provided when the customers fill in registration forms and service request forms. However, as the computerized systems become more complex, so do the forms.

Filling in some forms may be very often challenging and time consuming. For example, some of the forms may require providing very detailed information. Such detailed information may include tax-related data, immunization-related data and customer identification numbers, and may not be readily available. Furthermore, some of the forms may require inserting the same information over and over again.

Filling in the forms may also be error-prone. For example, the forms filled in manually may include typographical errors, and some data fields may be mistakenly omitted. Correcting such forms may be time consuming and burdensome.

SUMMARY

A cloud service device comprises one or more processors and one or more memories storing instructions which, when processed by the one or more processors, cause the cloud service device to perform: receiving a first request. The first request is for filling in a form document. Form document data, representing the form document, is determined based on, at last in part, first contents of the first request. The form document data of the form document is parsed, and one or more data information components are extracted. Each data information component, of the one or more data information components, comprises one or more of: a data text label, a data text field, and a data text field location. The data text field location indicates a location of the data text field on the form document. The data text field is labelled with the data text label and is to be filled with a text string. A personal information database that stores one or more text strings in association with one or more data text labels is identified, and filled form document data of a filled form document is generated. The filled form document data is generated by performing: for each data information component, of the one or more data information components of the form document, having the associated data text label: based on, at least in part, the associated data text label, the text string that is associated with the data text label is retrieved from the personal information database, and the text string is inserted into the data text field of the data information component at the data text field location.

BRIEF DESCRIPTION OF THE DRAWINGS

In the figures of the accompanying drawings like reference numerals refer to similar elements.

FIG. 1 is a block diagram that depicts an example arrangement for form auto-filling using a mobile device.

DETAILED DESCRIPTION

Figure 2A:
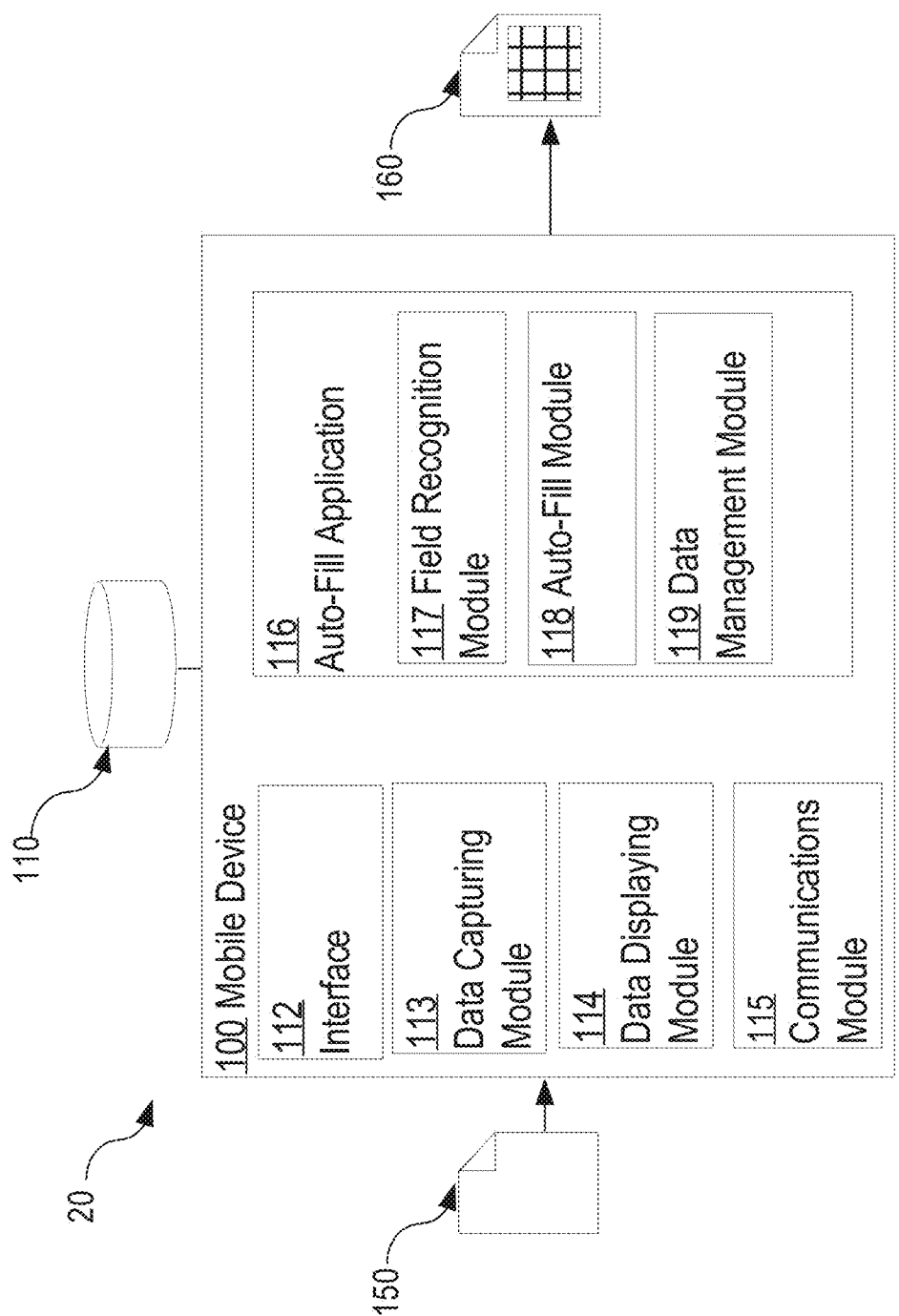
FIG. 2A is a block diagram that depicts an example arrangement for form auto-filling using a mobile device.

In the following description, for the purposes of explanation, numerous specific details are set forth in order to provide a thorough understanding of embodiments. It will be apparent, however, that the present embodiments may be practiced without these specific details. In other instances, well-known structures and devices are shown in block diagram form in order to avoid unnecessarily obscuring embodiments.

1.0 OVERVIEW
2.0 FORM AUTO-FILLING SYSTEM ARCHITECTURE FOR A MOBILE DEVICE
   2.1 MOBILE DEVICE
   2.2 PRINTING DEVICE
   2.3 CLOUD SERVICE SYSTEM
   2.4 STORAGE DEVICE 2.5 FORM AUTO-FILLING USING A MOBILE DEVICE
   2.5.1 FIRST EXAMPLE ARRANGEMENT
   2.5.2 SECOND EXAMPLE ARRANGEMENT
   2.5.3 THIRD EXAMPLE ARRANGEMENT
   2.5.4 PROCESS FLOW
      2.5.4.1 FIRST EXAMPLE PROCESS FLOW
      2.5.4.2 SECOND EXAMPLE PROCESS FLOW
3.0. FORM AUTO-FILLING SYSTEM ARCHITECTURE FOR A CLOUD SERVICE
   3.1 CLOUD SERVICE SYSTEM ARCHITECTURE
   3.2 FORM AUTO-FILLING USING A CLOUD SERVICE SYSTEM
   3.3 EXAMPLE PROCESS FLOW
4.0 DATABASE MANAGEMENT SYSTEM FOR FORM AUTO-FILLING
   4.1 DATABASE MANAGEMENT SYSTEM ARCHITECTURE
   4.2 EXAMPLE PROCESS FLOW
   4.3 EXAMPLE FORMS
   4.4 EXAMPLE DATA RECORDS
5.0. IMPLEMENTATION MECHANISMS

I. Overview

An approach is provided for automatic filling of form documents. Non-limiting examples of form documents may include registration forms, service request forms or any other forms that are to be filled in with personal information of an applicant or a user. For example, a user seeking services from a service provider may be asked to complete a new-customer registration form before the services may be provided to the user. Non-limiting examples of service providers may include healthcare service providers, telecommunications service providers and retail service providers. Examples of healthcare service providers may include hospitals, medical clinics, medical laboratories and other facilities providing healthcare services.

A patient who seeks services from a healthcare service provider may be asked to fill in a new-patient registration form. Some healthcare service providers ask new patients to fill in lengthy registration forms, and provide detailed personal information. Filling in some of the forms manually may be time consuming and error-prone. However, using an automatic fill-in approach, the patient may fill in such forms quickly and accurately. For example, a form may be filled in using personal information previously stored in a storage device.

Form document data for a form document may be acquired using different approaches and from different sources. For example, form document data may be acquired by taking a photograph of the form document or scanning the form document, and then converting the scanned data into the form document data.

Form document data may also be acquired from a cloud service. For example, upon providing the cloud service with geographical location information of a user, the cloud service may determine a registration form that the facility, in which the user is located, is using. Upon determining the registration form, the cloud service may determine the form document data, and transmit the form document data to the user.

Form document data may be parsed to identify one or more form document components. A form document component may comprise a data text label, a data text field and a data text field location. The data text field location may indicate a location of the data text field in the form document. For example, a form document component may be a portion of the form document and may be labelled as "First Name," have a data text field in which a user may enter his first name, and have data text field location information that identifies the location of the data test field on the form document.

User personal information and/or form document data of form documents may be stored in one or more databases. A database may be implemented in a variety of devices. For example, a database may be implemented as a local database of a mobile device, a remote database, a cloud service system, or any other data storage device accessible to the device implementing the approach for form auto-fill.

Filled form document data for a filled form document may be generated based on form document data and personal information data. Generating the filled form document data may include processing each data information component identified on the form document, and inserting respective text strings, containing personal information data, into the form. The text strings may be retrieved from a database storing personal information of a user.

Filled form document data may be stored or transmitted to other devices. For example, filled form document data may be transmitted to a printing device, which may generate a hardcopy of the filled form document. The filled form document data may also be transmitted to a cloud service and stored at the cloud service. Furthermore, the filled form document data may be transmitted to a server or any other storage system for future use.

Automatic filling in of form documents may be implemented in a variety of devices and systems. For example, the form auto-fill may be implemented in portable devices, such as mobile devices. The form auto-fill may also be implemented in a cloud service that is communicatively coupled with a user portable device.

A database management system may be used to manage form documents, filled form documents and user personal information. Various components of the database management system may be implemented in a mobile device, a cloud service, and database servers. For example, a database management system implemented in a cloud service may be configured to acquire form document data, acquire user personal information, and generate and maintain various associations between document data, service providers and users.

2.0 Form Auto-Filling System Architecture for a Mobile Device

FIG. 1 is a block diagram that depicts an example arrangement 10 for form auto-filling using a mobile device. Presented embodiments are not limited to the example arrangement 10 depicted in FIG. 1, and other example arrangements are described hereinafter.

In the example depicted in FIG. 1, arrangement 10 includes a mobile device 100. Mobile device 100 may have access to one or more storage devices 110, which may be implemented in mobile device 100 or remotely with respect to mobile device 100. Mobile device may also have access to a cloud service system 190.

Mobile device 100 may be configured to acquire form document data of a form document 150, process the form document data, retrieve user personal information from various sources, and generate filled form document data of a filled form document 160. Furthermore, mobile device 100 may transmit the filled form document data to a printing device 180, and cause printing device 180 to print hardcopies of filled form document 160. Printing device 180 may be implemented as a conventional printer, or as a multifunction peripheral (MFP) device configured to not only print document data, but also performing scanning, data conversion, faxing, and other types of data processing.

The communications links between mobile device 100, storage devices 110, cloud service system 190 and printing device 180 may be implemented by any medium or mechanism that provides for the exchange of data between the elements of FIG. 1. Examples of such links include, without limitation, a network such as a Local Area Network (LAN), Wide Area Network (WAN), Ethernet or the Internet, or one or more terrestrial, satellite or wireless links.

2.1 Mobile Device

Mobile device 100 may be communicatively coupled to one or more storage devices 110 and/or one or more peripheral devices such as a printing device 180. Mobile device 110 may also be communicatively coupled with one or more cloud service systems 190.

Mobile device 100 may be implemented as any type of device with wireless-communication capabilities, capabilities to generate, display and interact with a graphical user interface, capabilities to access the Internet, and other capabilities specific to the mobile device technology. Non-limiting examples of mobile device 100 include, without limitation, cellular telephonic devices such as cell phones, smart phones, personal digital assistants (PDAs), and tablet devices.

Mobile device 100 may be configured to display, on a touch screen display, series of graphical displays, each of which provides a user with choices, and each of which may be configured to accept the user's selections and to communicate the user's selections to other applications residing on mobile device 100.

In an embodiment, mobile device 100 hosts one or more applications facilitating communications with other devices, and facilitating execution of various tasks. For example, mobile device 100 can host an interface application that allows a user to authenticate to mobile device 100, an application that allows scanning information from form document 150, an application that allows communicating with storage device 110, and an application that allows mobile device 100 to communicate with other devices, such as printing device 180.

In an embodiment, mobile device 100 includes a scanner or a camera (or both) to acquire image data depicted in form document 150. For example, mobile device 100 may use a camera to take a photograph of form document 150. Alternatively, mobile device 100 may use a scanner to scan the text and graphics depicted in form document 150. For instance, mobile device 100 may be configured to scan the contents of a new-patient registration form. A new-patient registration form may include one or more data information components, such as a name of the form, and data text labels and data text fields for entering a first name, a last name, and other personal information of the new patient. The scanned or photographed data may be communicated to a data processing application, which may be executed by mobile device 100 or by cloud service system 190.

According to another example, mobile device 100 may be configured to scan a form identifier depicted in form document 150. The form identifier may be represented as an alpha-numerical string, a quick-response code (QR code), or any other encoded data. A QR code is a two dimensional code for representing data in a graphical form. In a QR code, data is encoded into strings that contain ones and zeroes, and the strings are represented graphically as rows and columns containing black and white pixels.

Identifying form documents in a database of document data may be accomplished using form identifiers. A form identifier may be transmitted to cloud service system 190, and cloud service system 190 may use the form identifier to identify form document 150.

Mobile device 100 may also be configured to transmit a request from mobile device 100 to a geographical location positioning system (GPS) to determine location information of a user of mobile device 100. The GPS may be implemented in mobile device 100, cloud service system 190, or other system, not depicted in FIG. 1. Upon receiving the location information of the user, mobile device 100 may execute an application configured to transmit the location information from mobile device 100 to cloud system 190, and request that cloud service system 190 provide form document data for form document 150.

Furthermore, mobile device 100 may execute an application configured to collect and aggregate user personal information. For example, mobile device 100 may execute a web browser application configured to generate a graphical user interface (GUI) to display an interactive menu, through which a user may enter his personal information, such as his first name, last name, date of birth, residence address, name of his employer, address of the employer, and so forth. The browser application may also allow the user to import user personal information data from various sources, such as user profiles created on social network websites. The collected personal information may be aggregated and stored in mobile device 100, storage device 110, and/or cloud service system 190.

Mobile device 100 may also collect and aggregate personal information of the users other than a user of mobile device 100. For example, mobile device 100 may execute an application that allows creating and storing profiles for a plurality of users. The application may be configured to create, aggregate and store personal information for a family members and even distant relatives. Such information may be useful when a patient tries to fill in a new-patient application at a healthcare service facility that requires a detailed family history.

Moreover, mobile device 100 may execute an application configured to fill in form document 150 using user personal information. For example, the application may be configured to parse form document data of form document 150, identify data information components in the form document data, and determine user personal information items for each of the data information components. The application may also be configured to retrieve the user personal information, and insert the user personal information into the respective data text field of the data information components on the form. For example, the application may parse form document data to identify a "Social Security Number" data text label, retrieve the social security number information of the user, and insert the social security number information into the "Social Security Number" data text field on the form.

In some situations, mobile device 100 may be unable to retrieve some personal information of a user. For example, mobile device 100 may be unable to retrieve social security numbers of the user's children. In such a situation, a notification may be displayed on a GUI of mobile device 100, and the user may be prompted to enter the particular information manually. The application may also be configured to allow the user to search the World Wide Web (WWW) or electronic messages for the particular information.

Mobile device 100 may also execute a web browser application configured to store filled form document data in storage device 110, or to transmit the filled form document data to an output device, such as printing device 180.

Alternatively, mobile device 100 may transmit the filled form document data to cloud service system 190. Then, cloud service system 190 may communicate with printing device 180 via for example, a link 111, and transmit a printing job containing the filled form document data to printing device 180.

2.2 Printing Device

Printing device 180 may be a network device configured to process print jobs, and to communicate with mobile device 100, and, optionally with cloud service system 190 via link 111.

Although the description herein refers to a printing device configured to process print jobs, printing device 180 may also be implemented in a MFP 180, and be configured to perform not only printing, but also scanning, faxing and other types of a document processing. For example, MFP 180 may be configured to scan form document 150, and generate form document data that represents form document 150. The form document data may be represented in a variety of formats. One example format is the portable form document (PDF™) from Adobe Systems, Inc., San Jose, Calif.

MFP 180 may also be configured to convert scanned document data from a non-text format, such as PDF™, to a text-based format, such as MsWord™ format. Conversion may be accomplished using various data conversion techniques, such as an optical character recognition (OCR) method. MFP 180 can further be configured to transmit the scanned document data to another location, such as storage device 110 and/or cloud service system 190.

MFP 180 may also be configured to retrieve electronic document data from storage device 110 and/or cloud service system 190, process the retrieved document data, and print, fax or transmit the processed document data to other devices. For example, MFP 180 may be configured to retrieve filled form document data from cloud service system 190, process the retrieved data, and either print the filled form document data, or fax it to for example, a registration office of a hospital.

Printing device 180 may be configured to generate and display a graphical user interface (GUI) with a touch screen or other medium for entering data. The GUI may be used by a user to select a print job and document data, initiate the print job containing the document data, initiate faxing the document data, and/or initiate other type of data processing on the document data.

2.3 Cloud Service System

Referring again to FIG. 1, in an embodiment, cloud service system 190 is configured to provide processing power, storage, and other computing services to mobile device 100 and printing device 180. The services may be provided via a web browser or other applications.

In an embodiment, cloud service system 190 may be viewed as a collection of services and data repository devices. At the hardware level, cloud service system 190 may comprise one or more network devices that host a plurality of service applications. The services offered by cloud service system 190 may be accessible to mobile device 100 and printing device 180 via the Internet using any of the data communications protocols, such as the Transmission Control Protocol (TCP), the Internet Protocol (IP), and other protocols. Each of the services in cloud service system 190 may be associated with a different communications protocol, a different IP address and/or a different port number.

Cloud service system 190 may be maintained by a single individual user, or an organization, such as a company, an association, a university, or other entity. An example of a cloud is the ICE (Integrated Cloud Environment) cloud system provided by Ricoh Company, Ltd.

Multiple organizations may share responsibility for maintaining cloud service system 190. For example, some of the services may be provided by individual users or organizations, other services may be provided by so called "third-party service providers." Non-limiting examples of "third-party service providers" of cloud service systems 190 include Box.net™ Google Docs™, Salesforce.com™, Evernote™, and Jigsaw™.

Cloud service system 190 may also provide storage services to mobile device 100 and/or printing device 180. For example, cloud service system 190 may host a group of storage devices configured to store digital data for various form documents. For example, in a healthcare service provider implementation, cloud service system 190 may host a group of storage devices configured to store digital data of images of registration forms, form document data for the registration forms, as well as filled form document data for filled registration forms.

Form document data and other information may be stored in a database managed or communicatively coupled to cloud service system 190. A database may be indexed using a variety of pointers, references and identifiers. For example, for each healthcare service provider that subscribes to cloud service system 190, cloud service system 190 may maintain one or more databases for storing form document data of various form documents used by the healthcare service provider. If a particular healthcare service provider maintains several departments, such as an emergency department, pediatrics, oncology, maternity, and an internal medicine department, and each of the above departments uses several form documents, then cloud service system 190 may create and maintain one or more databases for storing data for all the form documents, and index the databases using form identifiers, department identifiers and other identifiers.

Database maintained by cloud service system 190 for a healthcare service provider may be organized by one or more indexes, including indexes corresponding to form identifiers, indexes corresponding to department identifiers combined with form identifiers, or any other indexes.

Furthermore, a database may be searchable using geographical location information. For example, a database may maintain geographical location information for each department in a healthcare service provider facility, and upon receiving particular geographical location information, determine a particular department that is located at the particular location information. Thus, in response to receiving particular geographical location information of a patient, cloud service system 190 may be configured to determine the particular department in which the patient is located, and provide to the patient the form document data of a particular form document that is used by the particular department. This may be especially convenient when a patient finds himself in an already stressful situation, such as awaiting a treatment in an emergency room, and tries to fill in a registration form at the emergency room as he awaits the treatment. Having the registration form filled in automatically for the patient may ease the stressful situation.

According to an example, when a patient is being admitted to an emergency room in a hospital, and is asked to fill in a new-patient registration form specific to the emergency room, the patient may use mobile device 100 to obtain their geographical location information. The GPS application hosted on mobile device 100 may determine longitude and latitude coordinate values of the geographical location of the patient. Then, the patient may send a request to cloud service system 190 and include their geographical location information. Based on the geographical location information of the patient, cloud service system 190 may determine that the patient is in the emergency room of the particular hospital, and determine an identifier associated with the emergency room of the particular hospital. Then, cloud service system 190 may use the identifier to retrieve form document data of the new-patient registration form. The retrieved form document data may be downloaded to mobile device 100.

When form document data is downloaded to mobile device 100, a patient may use mobile device 100 to automatically fill in the form. For example, using his mobile device 100, the patient may access a user profile stored on mobile device 100, and invoke an application hosted on mobile device 100 that is configured to use the user personal information to fill in the form. Alternatively, the patient may send a request to cloud service system 190 to fill in the form.

Cloud service system 190 may be configured to receive a request from a patient to fill in a registration form. The request may include a user identifier, a Uniform Resource Locator (URL) or a link to a webpage that stores personal information of the user. Upon receiving the request, cloud service system 190 may access the indicated storage space, retrieve the personal information of the user, and use the retrieved personal information to fill in the form. Upon filling in the form, cloud service system 190 may transmit the filled form document data to mobile device 110, and/or directly to a healthcare service provider.

Furthermore, cloud service system 190 may provide document parsing capabilities for form document data of a form document 150. The parsing capabilities may include parsing the form document data into data information components. For the data information components, cloud service system 190 may identify data text labels, data text fields, and data text field locations associated with the data text labels. For example, cloud service system 190 may be configured to parse form document data of form document 150, and identify in the form data information components, such as a first name, a last name, an address, a social security, and so forth. For each data information component, cloud service system 190 may identify a data text label, a data text field associated with the data text label, and a data text field location at which the data text field is located on the form. If a data information component is labelled using an "Address" data text label, then cloud service system 190 may use the "Address" data text label as a search key for searching a personal information database of a user to find a text string that contains the address of the user. Once cloud service system 190 identifies the address text string, then cloud service system 190 may associate the address text string with the "Address" data text label, and enter the address text string into the data text field at the data text field location on the form.

Cloud service system 190 may also be configured to allow users to create user profiles. For example, cloud service system 190 may allow the patient to generate a patient profile for the patient, provide a GUI for entering personal information data to the patient profile, and store the patient profile in storage devices maintained by cloud service system 190 or storage device coupled to mobile device 100. Cloud service system 190 may also allow the user to import user profiles created using various web-based applications and social media networks, and merge the user profiles into one user profile managed by cloud service system 190.

Furthermore, cloud service system 190 may allow a user to extract personal information from already filled-in form documents, and store the extracted personal information in a user profile maintained by cloud service system 190. For example, using mobile device 100, a user may provide a scanned image of an already filled-in form document to cloud service system 190, and cloud service system 190 may convert the scanned image of the filled-in form document, identify personal information components in the form, extract the personal information components and the data text labels associated with the personal information components, and store the associations between the personal information and the corresponding labels of the personal information components in a storage device. Thus, cloud service system 190 may generate and maintain personal information for a user without having the user manually provide the personal information to cloud service system 190.

Cloud service system 190 may also provide capabilities for converting data from one data format to another. For example, cloud service system 190 may include OCR service for converting scanned document data (images of documents) represented in non-text format, such as PDF™, into text-based format. Cloud service system 190 may also be configured to generate a filled form document data in PDF™ format, or any other data format.

Cloud service system 190 may also include a forwarding service for transmitting form document data and/or filled form document data to one or more recipients. Cloud service system 190 may also be configured to forward data representing contents user profiles, data representing form identifiers, facility identifiers and other identifiers.

Furthermore, cloud service system 190 may be configured to determine one or more databases that contain personal information that may be used to fill in form documents. For example, cloud service system 190 may provide access to web-based Internet depositories, user webpages, social media accounts, and other sources that contain user personal information.

2.4 Storage Device

Storage device 110 may be implemented as any type of volatile or non-volatile storage for storing data. For example, storage device 110 may be random access memory (RAM), one or more disks, or any combination of RAM and one or more disks for storing scanned document data.

For illustration purposes only, FIG. 1 depicts one storage device 110. However, embodiments are not limited to one data storage 110. Arrangement 10 may include any number (or none) of data storages 110.

In some embodiments, storage device 110 may be implemented in a device that is remote with respect to mobile device 100. In other embodiments, storage device 110 may be implemented in mobile device 100. In yet other embodiments, storage device 110 may be a part of cloud service 190.

Storage device 110 may implement a database management system, and may include an interface for providing data to the databases maintained by the system. The interface may include a GUI, or any other interface configured to display and input data. The interface may be configured to input information about service provider facility, users, customers, form documents, and other types of information.

Storage device 110 may be implemented as a database. A database may have a hierarchical organization or any other organization that facilities storing, searching and retrieving data.

Databases maintained by storage device 110 may comprise a collection of data records. Data records may contain data cells, data tables and indexes. Data cells may be used to store data items and pointers to other cells used for storing data records. Data items may contain data strings and values, and may be searchable using search keywords or keys.

Databases maintained by storage device 110 may comprise form document data for form documents. For example, upon acquiring form document data for form document 150, a database application may store the acquired form document data and index the data using a form identifier corresponding to form document 150. If data is acquired for more than one form document 150, then the data may be stored in the database as indexed using different form identifiers.

Form identifiers may be provided manually or may be determined based on form document data of form document 150. For example, form document 150 may have a form identifier encoded using a QR code depicted on form document 150. Alternatively, a form identifier of form document 150 may be included as a text string depicted in a footnote portion or a margin portion of form document 150.

In an embodiment, a database maintained by storage device 110 may contain form document data for a plurality of form documents, and a plurality of form identifiers of the form documents. Furthermore, the database may include mappings between the form identifiers and the respective form document data. The database may be queried for providing form document data of a particular form document, and the query may comprise a form identifier of the particular form document. For example, using mobile device 100, a user may issue a query to the database to provide form document data for a particular new-patient registration form having a particular form identifier. Upon receiving the form identifier, the database may use a mapping between the form identifiers and the respective form document data, identify the particular form document data, and download to mobile device 100 the particular form document data.

Databases maintained by storage device 110 may also contain form document data for a plurality of form documents used by a plurality of service providers. Each of the service providers may have an associated service provider identifier, and the database may include mappings between the service provider identifiers, form document identifiers and form document data. The databases may be queried for providing form document data of a particular form document that is used by a particular service provider. A query may comprise a service provider identifier of the service provider whose form document data is sought.

For example, using mobile device 100, a user may issue a query to a database to provide form document data that a particular service provider is using for registering new patients. Upon receiving the query containing a service provider identifier, the database may use a mapping between the service provider identifiers and a plurality of form document identifiers. If more than one form identifiers are associated with the particular service provider identifier, then the database may cause displaying on mobile device 100 a notification or a menu itemizing the form identifiers, and prompt the user to select one or more form identifiers from the menu. Upon receiving the selection of a particular form identifier, the database may use the selection and the mapping between the form identifiers and the respective form document data, identify the particular form document data, retrieve the particular form document data, and download it to mobile device 100.

Databases may also maintain geographical location information of service providers for whom form document data is stored in the database. Therefore, the database may be searchable not only using form identifiers or the service provider identifiers, but also using geographical location information. For example, a user may provide his current geographical location information, and the user's geographical location information may be used to determine in which service provider facility the user is present. Once a particular service provider facility is determined, a particular identifier of the service provider facility may be determined. The particular identifier may be used to determine form document identifiers of the form documents that the particular service provider is using.

Geographical location information may be determined using GPS applications implemented in mobile device 100 and/or cloud service system 190. The geographical location information may be transmitted to a database maintained by a database management system. The geographical location information may be transmitted as encapsulated in a query. The query may also include a request for providing form document data of a form document that is used by a service provider facility located at (or near) the provided geographical location. Upon receiving the query, the database management system may parse the query, extract the geographical location information from the query, and use the extracted geographical location information to determine a particular service provider facility at which (or near which) the user is located. To accomplish that, the database management system may determine a mapping between ranges of geographical location coordinates and service provider identifiers. Once the service provider identifier is determined, the database management system may identify one or more form document identifiers, and use them to determine form document data for form documents that the particular service provider is using. The user may be presented with a menu of the forms that the facility is using, or, if just one form is being used, the form document data of a particular form document may be downloaded to mobile device 100.

Database management system may maintain one or more databases configured to store various types of data records. For example, the system may maintain a service provider database, a form document database, a service provider form document database, a user database, a customer service database, and others. In healthcare implementations, a database management system may maintain a hospital location database, a hospital patient form database, a patient database, a hospital reception database, and other databases related to providing healthcare services.

Hospital location database may comprise data records for storing hospital-related information. For example, for each hospital that subscribes to services from a database management system, the database management system may store hospital location information, hospital identification information, hospital name information, and other information that may be useful in identifying or locating the hospital.

Hospital database may comprise data records for storing data related to form documents used by a hospital. For example, a database may comprise data records for storing form document identifiers, patient form information, hospital identifiers, hospital name information, form document data for the form documents, and other data records.

Hospital database may also comprise patient data records. For example, a hospital patient-data database may be used to store data records that comprise patient identifiers, patient names, date-of-birth information, patient address information, patient contact information, patient insurance provider information, patient insurance plan identifier, and other data records.

Hospital reception database may be maintained to store reception-related information. For example, a hospital reception database may comprise data records including hospital name information, hospital identifier information, hospital reception system identifier, or other data records.

2.5 Form Auto-Filling Using a Mobile Device

2.5.1 First Example Arrangement

FIG. 2A is a block diagram that depicts an example arrangement 20 for form auto-fill using mobile device 100. Presented embodiments are not limited to the example arrangement 20 depicted in FIG. 2A, and other example arrangements are described hereinafter.

In the example depicted in FIG. 2A, arrangement 20 includes mobile device 100. Mobile device 100 has access to one or more storage devices 110. Mobile device 100 is configured to acquire form document data for form document 150, process the form document data, retrieve personal information of a user of mobile device 100, and generate filled form document data of a filled form document 160.

In an embodiment storage device 110 is implemented in mobile device 100 and is a part of mobile device 100. However, in other embodiments, storage device 110 may be a remote storage device that is communicatively coupled with mobile device 100.

In an embodiment, mobile device 100 comprises various modules and components. Non-limiting examples of such modules and components include an interface 112, a data capturing module 113, a data displaying module 114, a communications module 115, and an auto-fill application 116. Other embodiments may include only some of the above modules and components. Yet other embodiments may include additional modules or components not depicted in FIG. 2A.

Interface 112 may be configured as a touch screen, a keyboard or any other form of interface for communicating data between mobile device 100 and a user. Interface 112 may be configured to display series of graphical displays, each of which may provide a user with choices, and each of which may be configured to accept the user's selection and to communicate the user's selections to other applications residing on mobile device 100. For example, interface 112 may be configured to display series of menu items including names of various form documents, and provide the user with the ability to select a particular form document from the menu.

Data capturing module 112 may be configured to capture data representing form document 150. Data capturing module 112 may be configured to operate a scanner and/or a camera, and facilitate scanning or taking a photograph of form document 150. The captured data may be further processed and stored in storage device 110, which may be implemented on mobile device 150, a remote storage device (not depicted in FIG. 2A), or cloud service system (not depicted in FIG. 2A). For example, data capturing module 112 may be configured to scan form document 150, and store the scanned data on mobile device 110.

Data displaying module 114 may be configured to control a GUI implemented on mobile device 100, and use the GUI to display information for a user and receive information from the user. For example, data display module 114 may display on a display screen of the GUI various menu options for the user, and receive menu selections from the user. The GUI may be used to enter user personal information to mobile device 110. Furthermore, the GUI may be used to request form document data. Moreover, the GUI may be used to selecting a particular form document, filling in the particular form document, and sending filled form document data to storage device 110.

Communications module 115 may be configured to facilitate communications between various components of mobile device 100 and to facilitate communications between mobile device 100 and other devices, such as storage device 110. Communications module 115 may implement various communications protocols, including the Transmission Control Protocol (TCP), the Internet Protocol (IP), the Bluetooth Protocol, and other protocols.

Auto-fill application 116 may include various modules and components. Examples of the modules and components include a field recognition module 117, an auto-fill module 118, and a data management module 119. Other embodiments may include only some of the above modules and components. Yet other embodiments may include additional modules or components not depicted in FIG. 2A.

Field recognition module 117 may be configured to process data captured by data capturing module 113. For example, field recognition module 117 may perform OCR processing on the data captured by data capturing module 113, and generate form document data from the captured data. Alternatively, field recognition module 117 may transmit the data captured by data capturing module 113 to communications module 115, and cause communications module 115 to transmit the captured data to cloud service system (not depicted in FIG. 2A) to perform OCR processing on the captured data, and provide the form document data to mobile device 100.

Furthermore, field recognition module 117 may process form document data. For example, field recognition module 117 may parse the form document data, identify form data information components, such as a first name component, a last name component, an address component, a social security component, and so forth. For each data information component, field recognition module 117 may determine a data text label, a data text field and a data text field location. For example, if field recognition module 117 identified a first name component, then the module may determine for that component a label ("First Name"), a data text field in which the first name of a user is to be entered, and a data test field location of the data text field on form document 150.

Auto-fill module 118 may be configured to perform auto-fill services. For example, auto-fill module 118 may be configured to receive information about data information components identified by field recognition module 117 in form document data, and determine user personal information for the components. Hence, for a first name component, having a data text label "First Name," auto-fill module may determine a text string that contains the first name of the user, and used the determined text string to fill in a data text field associated with the "First Name" label on a form document. In particular, auto-fill module 118 may use the "First Name" data text label as a search key for searching a personal information database maintained for the user to find the text string that contains the first name of the user. Once the first name text string is identified, auto-fill module 118 may associate the first name text string with the "First Name" data text label, and enter the first name text string into the data text field at the data text field location on the form.

Data management module 119 may be configured to maintain one or more databases for storing various types of data records. For example, data management module 119 may maintain one or more databases for storing personal information of a user, electronic mail managed by the user, a database containing user documents and files, and a database containing music files, games, and other electronic data. Data to the databases may be entered manually, using for example, a GUI implemented in mobile device 100, or downloaded from software application, files, user profiles, social media networks, and the like. For example, a user may create a personal profile using the GUI and data management module 119 by importing user personal information from the profiles that the user has already created using various social media tools.

Furthermore, data management module 119 may be configured to store form document data and filled form document data for a user. For example, if a user tried to use mobile device 110 to auto-fill a new-patient registration form, then the form document data for the new-patient registration form and filled form document data for the filled form document may be stored in storage device 110 of mobile device 100. Alternatively, data management module 119 may be used to transmit the form document data and filled form document data to communications module 115, and cause communications module 115 to transmit the data to a cloud service system (not depicted in FIG. 2A) for storage.

2.5.2 Second Example Arrangement

Figure 2B:
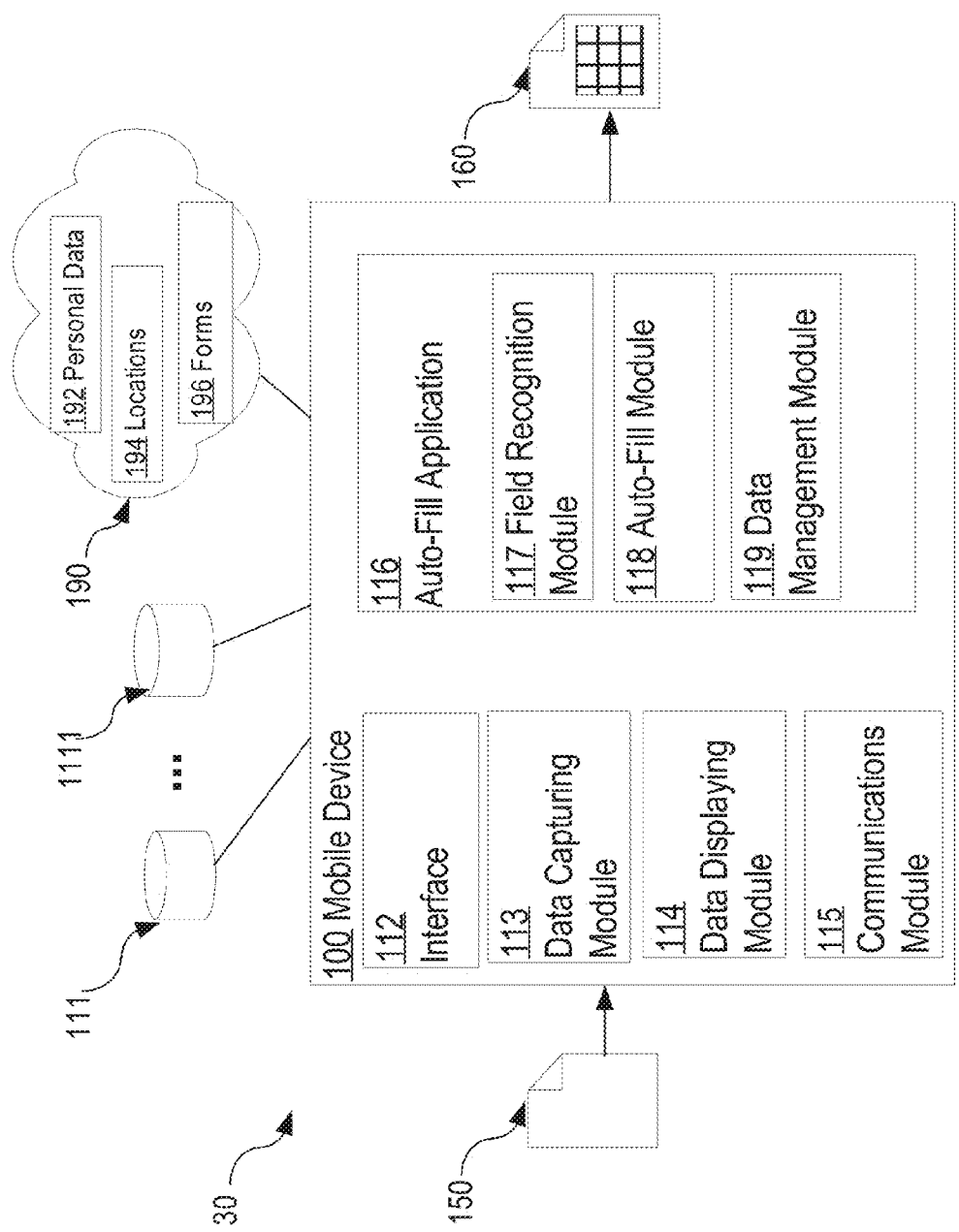
FIG. 2B is a block diagram that depicts an example arrangement for form auto-filling using a mobile device.

FIG. 2B is a block diagram that depicts an example arrangement 30 for form auto-filling using mobile device 100. Presented embodiments are not limited to the example arrangement 30 depicted in FIG. 2B, and other example arrangements are described hereinafter.

In the example depicted in FIG. 2B, arrangement 30 includes mobile device 100. Mobile device 100 comprises various modules and components. Non-limiting examples of such modules and components include an interface 112, a data capturing module 113, a data displaying module 114, a communications module 115, and an auto-fill application 116, each of which was described in detail in FIG. 2A. Other embodiments may include only some of the above modules and components. Yet other embodiments may include additional modules or components not depicted in FIG. 2B.

Auto-fill application 116 may include various modules and components. Examples of the modules and components include a field recognition module 117, an auto-fill module 118, and a data management module 119, each of which was described in FIG. 2A. Other embodiments may include only some of the above modules and components. Yet other embodiments may include additional modules or components not depicted in FIG. 2B.

FIG. 2B also depicts one or more storage devices 111 . . . 111l, and one or more cloud service systems 190. In an embodiment, storage devices 111 . . . 111l and cloud service system 190 are implemented in devices that are located remotely with respect to mobile device 110. For example, storage devices 111 . . . 111l and cloud service system 190 may communicate with mobile device 110 via various communications links and various communications network, including secure, private and wireless networks.

Storage devices 111 . . . 111l and cloud service system 190 may be used to implement one or more databases. The databases may be used to store various types of data. Non-limiting examples of the data stored in the storage devices and the cloud service system include user profile data, form document data, filled form document data, and other documents and files.

In healthcare implementations, storage devices 110 . . . 112 and cloud service system 190 may maintain a hospital location database, a hospital patient form database, a patient database, a hospital reception database, and other databases related to providing healthcare services. For example, cloud service system 190, implemented for a network of healthcare service providers, may store patient personal data 192 of patients serviced by the healthcare service providers, facility location information 194, and form document data 196 used by the healthcare service providers.

Patient personal data 192 may contain patient records. Implementations of a database containing patient personal data 192 may vary. In one implementations, patient personal data record may include a patient name, a patient identification number, a date of birth, an address, a telephone number, a name or identification of the insurance provider, an identifier of the insurance plane, and other information specific to the patient.

A database containing patient personal data 192 may be generated automatically. For example, the database records may be generated based on filled form document data provided by patients or receptionists of healthcare service providers. The filled form document data may be transmitted to cloud service 190 from mobile device 100, or may be requested and then downloaded from mobile device 100. Furthermore, the filled form document data may be transmitted to, or downloaded from, storage devices 111 . . . 111l. Moreover, the filled form document data may be transmitted to cloud service system 190 from other devices, including fax machines, personal computers, and the like. Alternatively, patient personal data 192 may be manually entered by an operator of cloud service system 190.

Facility location information 194 may be stored in cloud service system 190 for one or more healthcare service providers that are serviced by cloud service system 190, and may include location information of each of the facilities, identifiers of the facilities, name information of the facilities and other information specific to the providers. Furthermore, facility location information 192 may include geographical location information of service providers for who form document data is stored in the database. Therefore, facility location information 192 may be searchable using identifiers, names and geographical location information of the healthcare service providers.

Form document data 196 may include information about form documents used by healthcare service providers serviced by cloud 190. For example, form document data 194 may include form identifiers, form document data, healthcare provider identifiers, healthcare provider names, and other form related information. Form document data 194 may be searchable using form identifiers, healthcare service provider identifiers, healthcare provider names, and using other methods. In an embodiment, a database maintained by storage devices 110 . . . 112 may contain form document data for a plurality of form documents, and a plurality of form identifiers of the form documents.

Furthermore, databases implemented in cloud service system 190 may include mappings between form identifiers and respective form document data. The database may be queried for providing form document data of a particular form document, and the query may comprise a form identifier of the particular form document. Upon receiving the form identifier, the database may use a mapping between the form identifiers and the respective form document data, identify the particular form document data, and download the particular form document data to mobile device 100.

Furthermore, databases implemented in cloud service system 190 may be queried for providing form document data of a particular form document that is used by a particular service provider. A query may comprise a service provider identifier of the service provider whose form document data is sought. Upon receiving the query containing the service provider identifier, the database may use a mapping between the service provider identifiers and a plurality of form document identifiers. If more than one form identifiers are associated with the particular service provider identifier, then the database may cause displaying on mobile device 100 a notification or a menu itemizing the form identifiers, and prompt the user to select one or more form identifiers from the menu. Upon receiving the selection of a particular form identifier, the database may use the selection and a mapping between the form identifiers and the respective form document data, identify the particular form document data, retrieve the particular form document data, and download it to mobile device 100.

Moreover, database implemented in cloud service system 190 may be queried for providing form document data for a form document that is used by a healthcare service provider located at a particular location. The particular location may correspond to geographical location information of user who seeks the form document data. Geographical location information may be determined using GPS applications implemented in mobile device 100 and/or cloud service system 190, and transmitted to cloud service system 190. The geographical location information may be transmitted as encapsulated in a query. The query may also include a request for providing form document data of a form document that is used by a service provider facility located at (or near) the provided geographical location. Upon receiving the query, the query is parsed, and the geographical location information is extracted from the query and used to determine a particular service provider facility at which (or near which) the user is located. To accomplish that, a mapping between the geographical location information ranges and service provider identifiers may be used. Once the service provider identifier is determined, one or more form document identifiers may be determined and used them to determine form document data.

2.5.3 Third Example Arrangement

Figure 2C:
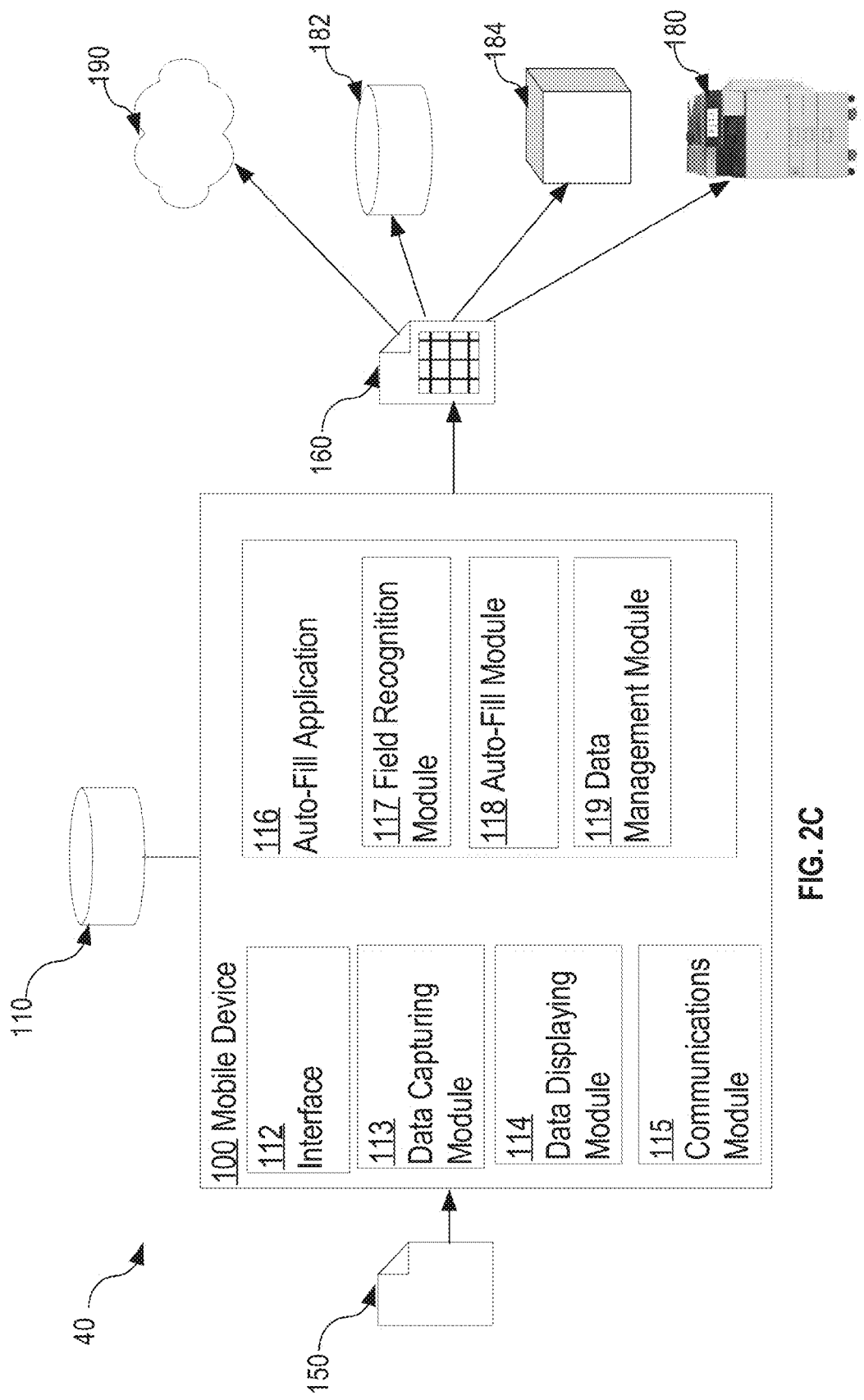
FIG. 2C is a block diagram that depicts an example arrangement for form auto-filling using a mobile device.

FIG. 2C is a block diagram that depicts an example arrangement 40 for form auto-filling using mobile device 100. Presented embodiments are not limited to the example arrangement 40 depicted in FIG. 2C, and other example arrangements are described hereinafter.

In the example depicted in FIG. 2C, arrangement 40 includes mobile device 100. Mobile device 100 comprises various modules and components. Non-limiting examples of such modules and components include an interface 112, a data capturing module 113, a data displaying module 114, a communications module 115, and an auto-fill application 116, each of which was described in detail in FIG. 2A. Other embodiments may include only some of the above modules and components. Yet other embodiments may include additional modules or components not depicted in FIG. 2C.

Auto-fill application 116 may include various modules and components. Examples of the modules and components include a field recognition module 117, an auto-fill module 118, and a data management module 119, each of which was described in FIG. 2A. Other embodiments may include only some of the above modules and components. Yet other embodiments may include additional modules or components not depicted in FIG. 2C.

FIG. 2C also depicts systems and peripheral devices used to store or further process form document data, including filled form document data of form document 160. The systems and devices depicted in FIG. 2C include a cloud service system 190, a storage device 182, a server device 184, and a printing device 180. Other example arrangements 40 may include some of the devices 180-190, but not all of them. Yet other example arrangements 40 may include additional devices not depicted in FIG. 2C.

Cloud service system 190 may be viewed as a collection of services and data repository devices configured to provide a variety of services to mobile device 100. Various examples of services provided by cloud service system 190 are described in detail in FIG. 1. For example, cloud service system 190 may receive filled form document data of filled form document 160 and store the filled form document data in storage maintained by cloud service system 190. Furthermore cloud service system 190 may process the filled form document data, index the filled form document data and made the indexed data available to various devices, applications and users.

Storage device 182 may be any type of storage device configured to communicate with mobile device 100. Storage device 182 may be configured to store filled form document data of filled form document 160.

Server device 184 may be any type of device configured to provide services to mobile device 100, and may be used to store filled form document data of filled form document 160. Server device 184 may also encrypt the filled form document data, or otherwise process the data.

Printing device 180 may be configured to receive data from mobile device 100 or cloud service system 190, process the received data and generate a hardcopy of the data. Printing device 180 may be implemented as a MFP device. Printing device was described in detail in FIG. 1.

2.5.4 Process Flow

Figure 3:
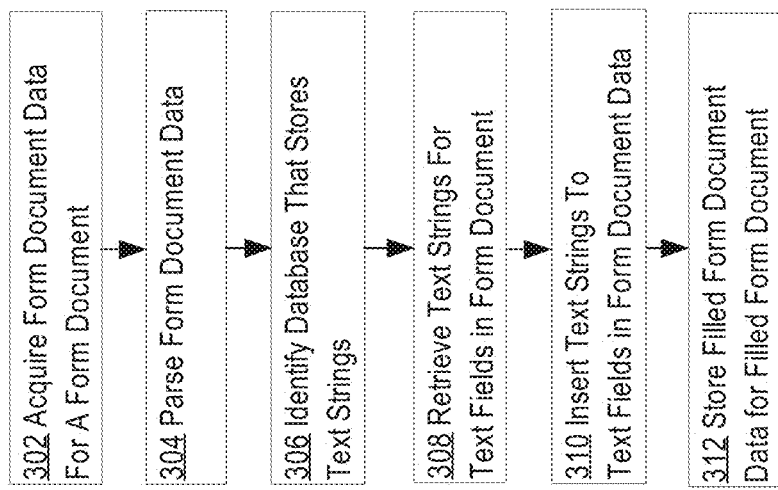
FIG. 3 is a flow diagram that depicts an approach for form auto-filling using a mobile device.

FIG. 3 is a flow diagram that depicts an approach for form auto-filling using applications executed by a mobile device. In step 302, a mobile device application acquires form document data for a form document. Form document data for a form document may be acquired using different approaches and from different sources. For example, form document data may be acquired by taking a photograph of the form document or by scanning the form document, and then converting the scanned data into form document data. Form document data may also be acquired from a cloud service system. For example, upon providing the cloud service with geographical location information of a user who is located at a particular service provider facility, the cloud service may determine a form document that the user might need, determine form document data for the form document, and transmit the form document data to the mobile device.

Form document data may also be acquired using an entity identifier of an entity for which the form document data is sought. For example, a mobile device application may scan an entity identifier of the entity, such as a hospital or a medical clinic, and retrieve, based on the entity identifier, the form document data. The entity identifier may be displayed on signs posted within the hospital, at a reception desk, or other locations. The entity identifier may be encoded as a QR code, or any other digital code.

Form document data may also be acquired using a menu displayed on a mobile device. For example, a mobile device application may scan a hospital identifier and send the hospital identifier to a cloud service system. The cloud service system may use the identifier to determine one or more form document identifiers, and cause displaying the one or more form document identifiers in a display of the mobile device. The user may select one of the displayed form document identifiers, and cause transmitting the selection to the cloud service system. Using the received selection, the cloud service system may determine a particular form identifier, then form document data for the particular form identifier, and send the form document data to the mobile device.

Furthermore, form document data may be acquired based on geographic location information of a user of a mobile device. A user may request the geographic location information from a GPS system, and upon receiving that information, may cause transmitting it to a cloud service system. The cloud service system may use the geographic location information to determine a hospital identifier of a hospital at which the user is present. The hospital identifier may be used to determine form document data representing a form document, and the form document data may be downloaded to the mobile device.

In step 304, a mobile device application parses form document data. Form document data may be parsed to identify one or more form document components depicted in a form document. A form document component may comprise a data text label, a data text field and a data text field location, which indicates a location of the data text field in the form document. For example, a form document component may be labelled as "Last Name," have a data text field in which a user may enter his last name, and have data text field location information that identifies the location of the last name text field on the form document.

In step 306, a mobile device application identifies database that stores personal information of a user. Personal information of a user may be stored in a variety of storage devices and cloud service systems, some of which are described in FIG. 2B. Non-limiting examples of databases used to store user personal information may include a local database that is locally accessible to the mobile device application, a remote database that is remotely accessible to the mobile device application, a server database that is accessible to the mobile device application via a server computer and a cloud system database that is accessible to the mobile device application via a cloud service.

User personal information may include a first name of the user, a last name, an address, a social security number, and other personal data. User personal information data may be entered to a database from a mobile device, or downloaded to the database from various data sources.

In step 308, a mobile device application retrieves user personal information from a personal information database. For example, the mobile device application may download the personal information data from a personal information database to a memory unit of a mobile device. Alternatively, the mobile device application may establish a secure communications link with a database storage device, and enable searching the personal information database for the personal data.

Personal information database may be searched by providing a data text label as a search key. For example, if a user tries to fill in a data text field that is labelled on a form document with a "Driver License" data text label, then the "Driver License" data text label may be used as a search key to determine a text string that contains a user's driver license number.

In some situations, a mobile device application may be unable to determine user personal information for one or more data information components or for one or more data text labels. In such a situation, the mobile device application may generate an error notification, and cause displaying the error notification on a display of a mobile device. The error notification may indicate a data text label for which personal information data is unavailable. The mobile device application may also display a GUI on the display of the mobile device, and prompt the user to manually enter the personal information data. Upon receiving input from the user, the mobile device application may use the inputted data as a text string to be entered in a data text field labelled by the data text label. is stored in the database;

In step 310, a mobile device application inserts text strings to text fields in form document data. The mobile device application may repeat the process of retrieving the text strings for text fields and inserting the text strings to text fields for each data information component on a form document. Upon completing the repeating and the retrieving and inserting for all data information components, the mobile device application may finish generating filled form document data of a filled form document. For example, upon completing the repeating and retrieving for all data information components on a new-patient registration form, the application may complete generating filled form document data for the new-patient registration form.

In step 312, a mobile device application stores filled form document data for a filled form document. The filled form document data may be stored in a data storage maintained by a mobile device, a remote data storage device or a cloud service system.

Furthermore, a mobile device application may transmit filled form document data to a peripheral device, such as a MFP device or a printing device, and cause the peripheral device to print the filled form document data.

Moreover, a mobile device application may transmit filled form document data to a service provider registration system. For example, the filled form document data may be transmitted to a hospital reception system, and then be downloaded to a patient database maintained by the hospital reception system.

2.5.4.1 First Example Process Flow

Figure 4:
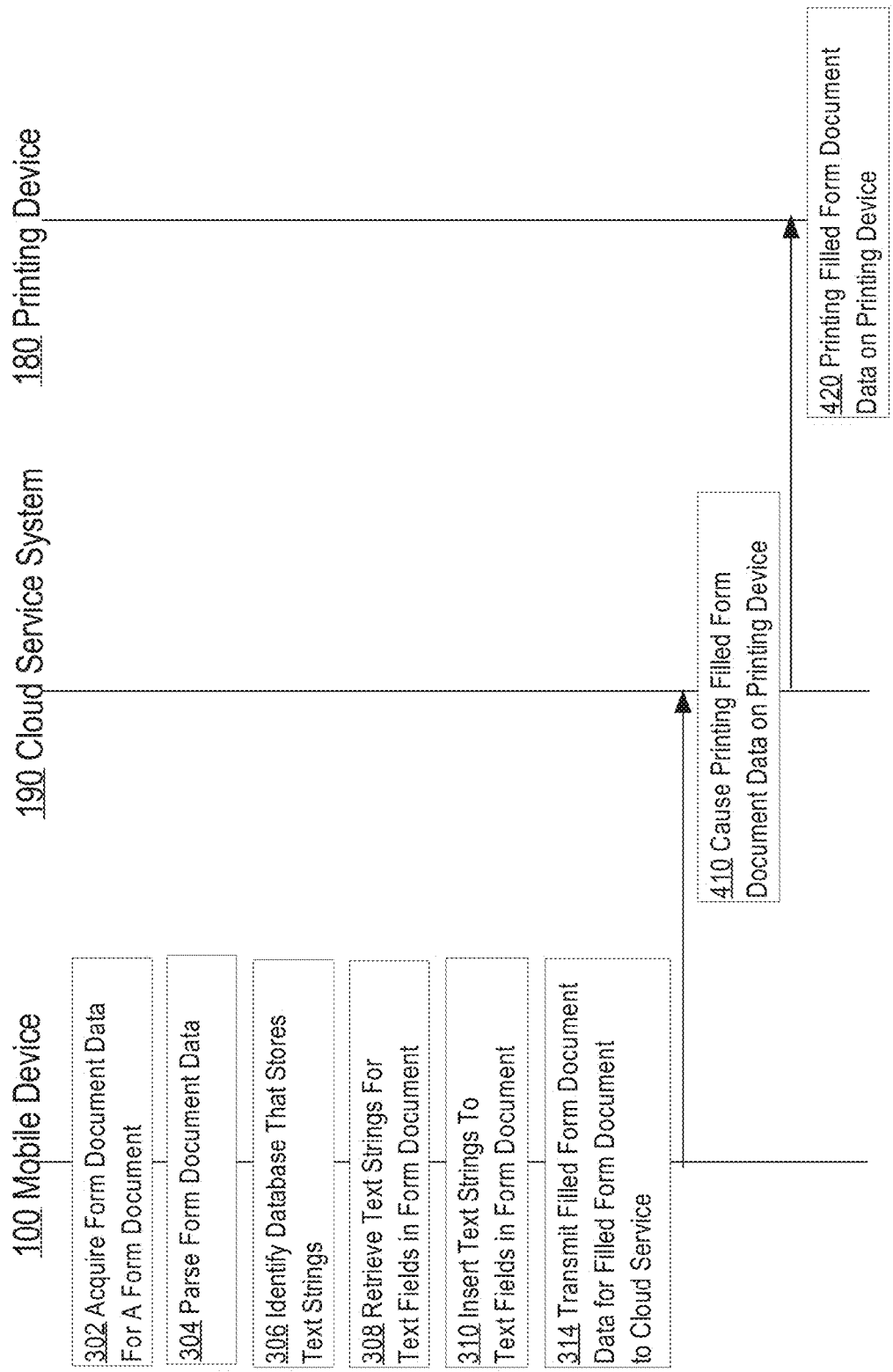
FIG. 4 is a block diagram that depicts example communications between devices implementing a form auto-filing approach.

FIG. 4 is a block diagram that depicts example communications between devices implementing a form auto-filling approach. In the depicted example, mobile device 100 implements the form auto-filling approach, and communicates with cloud service system 190, causing cloud service system 190 to initiate data printing on printing device 180.

In an embodiment, mobile device 100 executes one or more mobile device applications configured to perform the steps 302, 304, 306, 308 and 310, described in details in FIG. 3. Upon completing step 310 (in which a mobile device application inserts text strings to text fields of a form document), the mobile device application proceed to step 314.

In step 314, a mobile device application transmits filled form document data for a filled form document to cloud service system 190. The filled form document data may be transmitted to cloud service system 190 in a data file, attached to an electronic email, or using any other communications media. Furthermore, the mobile device application may indicate to cloud service system 190 how the filled form document data is to be processed. For example, the mobile device application may indicate that the filled form document data is to be stored in cloud service system 190 and made available to certain users and/or entities. The mobile device application may also indicate that the filled form document data is to be printed out on a certain printing device and using certain printing settings. For example, the mobile device application may provide an identifier of a printing device 180, and provide certain feature and option settings that printing device 180 is to use when processing a printing job containing the filled form document data. Furthermore, the mobile device application may ask cloud service system 190 to generate a print job comprising the filled form document data, the certain feature and option settings for performing the print job, and an identifier of printing device 180.

In step 410, a cloud service application of cloud service system 190 receives instructions from a mobile application executed on mobile device 100. The instructions may include a request to print filled form document data on a particular printing device. The instructions may also include a print job identifier of a print job stored in cloud service system 190.

Upon receiving instructions to print filled form document data on a printing device 180, a cloud service application may retrieve a print job containing the filled form document data, transmit the print job to printing device 180, and cause printing device 180 to perform the print job.

In step 420, a printing device application of printing device 180 receives a print job from cloud service system 190, and executes the print job. The print job may include a link to a storage space containing filled form document data and a link to a storage space containing information about option and feature settings to be used in processing the print job. For example, the printing device application may receive instructions for printing the filled form document data in a secure mode, in which a hardcopy of the filled form document data is generated by printing device 180 upon receiving authentication or authorization information from for example, a receptionist employed by a service provider. Generating the hardcopy in the secure mode may protect personal information of a user who filled in a form document. For example, in a healthcare service provider application, a filled form document may include personal and sensitive information of a patient. Therefore, it may be recommended that the filled form document data is printed in the secure mode.

2.5.4.2 Second Example Process Flow

Figure 5:
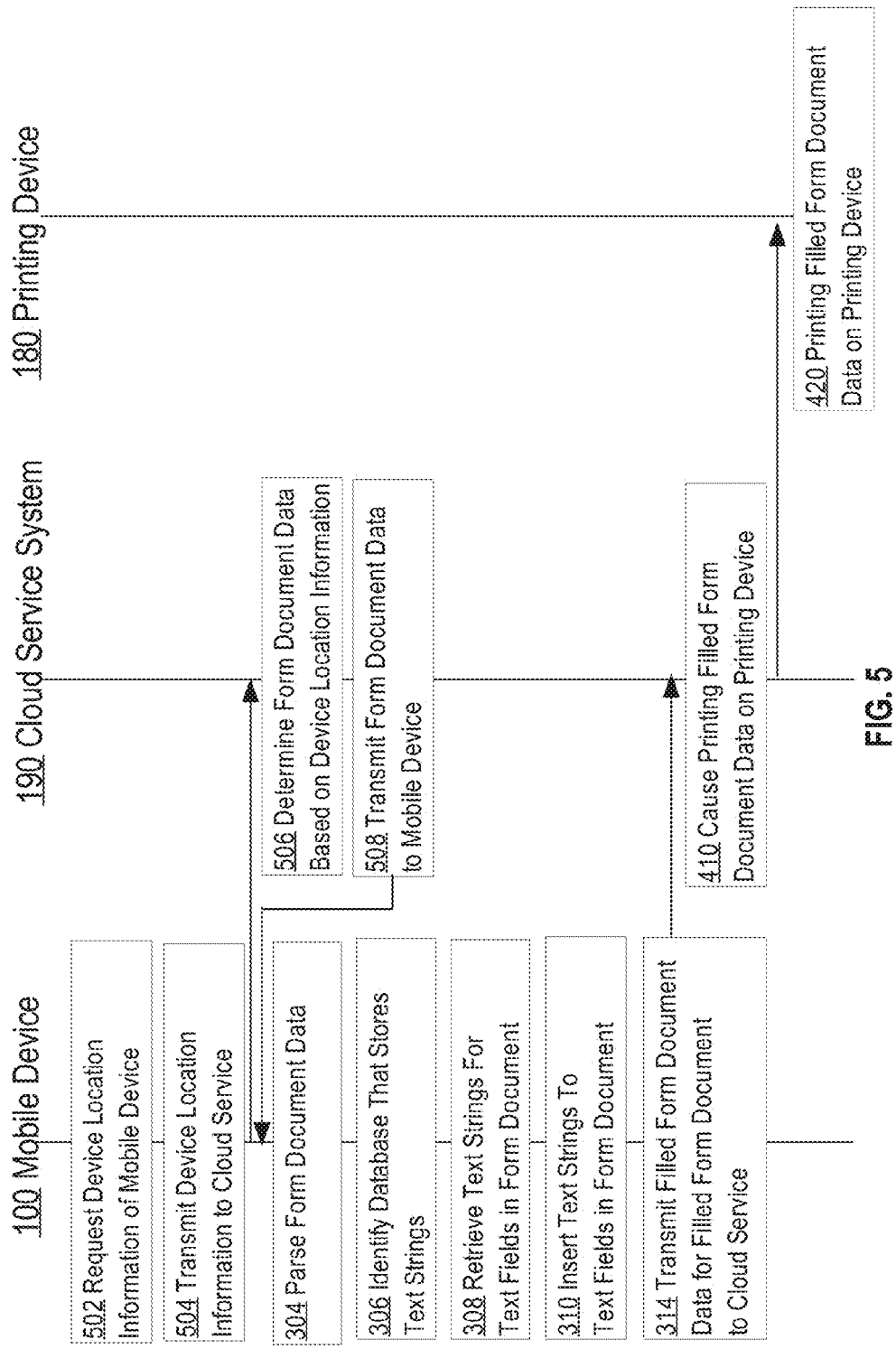
FIG. 5 is a block diagram that depicts communications between devices implementing a form auto-filing approach.

FIG. 5 is a block diagram that depicts communications between devices implementing a form auto-filing approach. In the depicted example, mobile device 100 implements the form auto-filling approach, and communicates with cloud service system 190.

In step 502, a mobile device application of mobile device 100 may request location information of mobile device 100. For example, the mobile device application may communicate with a GPS application that is configured to determine geographical location information of mobile device 100. The GPS application may be executed on mobile device 100, or alternatively, it may be executed on cloud service system 100. The geographical location information may include latitude and longitude coordinate system values corresponding to the geographical location of the mobile device 100.

In step 504, a mobile device application transmits device location information to cloud service system 190.

Upon receiving device location information, cloud service system 190 may use the device location information to determine form document data. This may be accomplished using a variety of approaches; some of them were described in reference to cloud service system 190 in FIG. 1.

In step 508, cloud service system 190 transmits form document data to mobile device 100.

Upon receiving form document data, a mobile device application proceeds to performing the steps 304, 306, 308, 310 and 314 described in detail in FIG. 4.

Upon completing step 314 (in which a mobile device application transmits filled form document data for a filled form document to cloud service system 190), a cloud service application proceeds to step 410.

In step 410, a cloud service application of cloud service system 190 receives instructions from a mobile application executed on mobile device 100. The instructions may include a request to print, fax or store filled form document data Upon receiving instructions to print filled form document data on a printing device 180, a cloud service application may retrieve a print job containing the filled form document data, transmit the print job to printing device 180, and cause printing device 180 to perform the print job.

In step 420, a printing device application of printing device 180 receives a print job from cloud service system 190, and executes the print job. For example, the printing device application may receive instructions for printing the filled form document data, and notifying a receptionist employed by a service provider that a hardcopy of the filled form document data has been generated.

There are many benefits of implementing a form auto-filling approach in mobile device 100. For example, a user of mobile device 100 may quickly and effortlessly fill in many types of forms, including new-patient registration forms, claim forms and the like. Using the automated approach allows the user to quickly fill in the forms even if filling in the forms requires that the user provide very detailed information, some of which may not be readily available to the user.

Furthermore, by using an automated fill-in approach, a user of mobile device 100 may fill in forms accurately, and thus avoid the pitfalls of a manual approach. For example, the user may avoid making typographical errors when filling in the forms.

Figure 6:
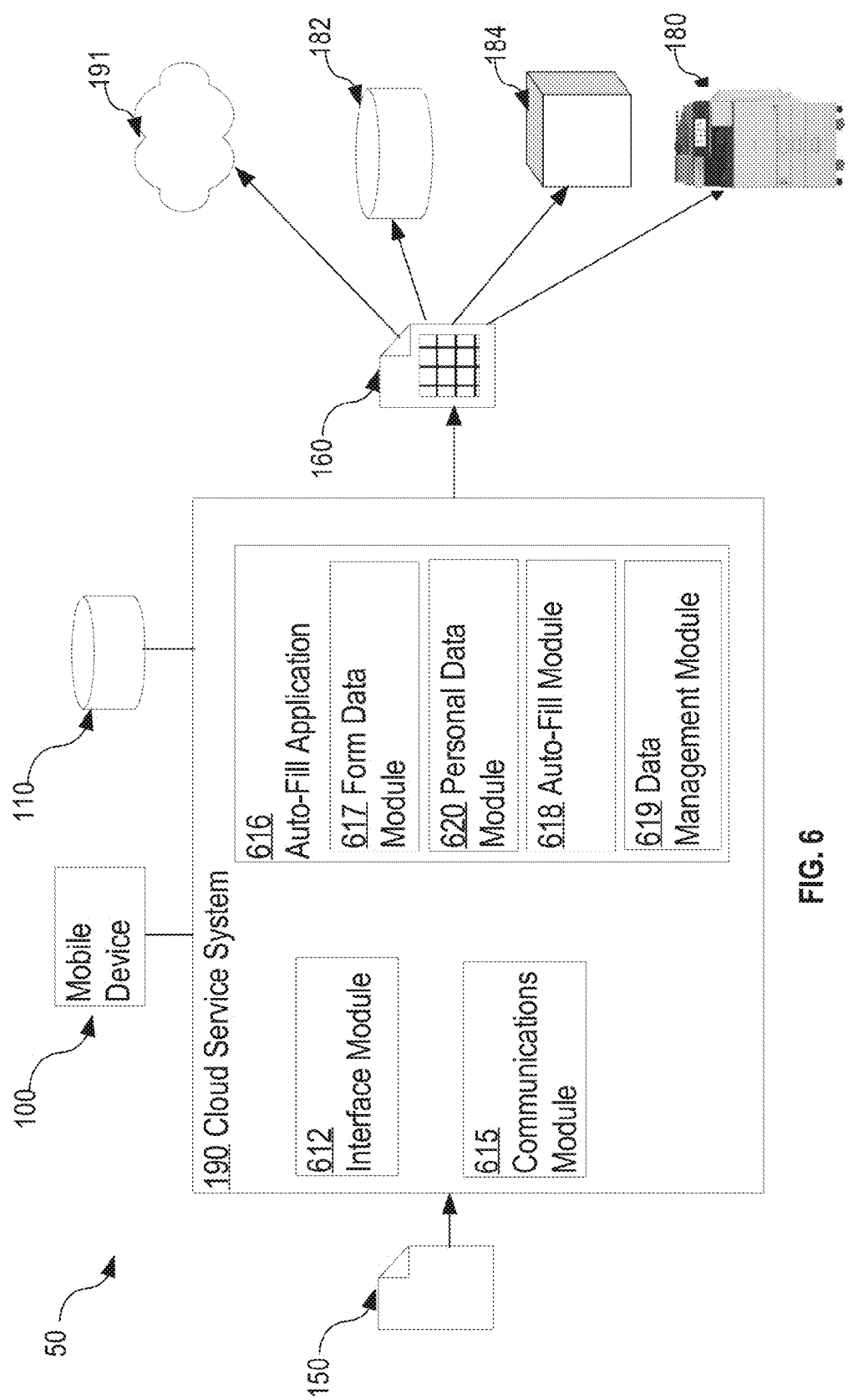
FIG. 6 is a block diagram that depicts an example arrangement for form auto-filling using a cloud service.

3.0. Form Auto-Filling System Architecture for a Cloud Service 3.1 Cloud Service System Architecture FIG. 6 is a block diagram that depicts an example arrangement 50 for form-auto-filling using a cloud service 190. Presented embodiments are not limited to the example arrangement 50 depicted in FIG. 6, and other example arrangements are described hereinafter.

In the example depicted in FIG. 6, arrangement 50 includes mobile device 100, storage device 110, and cloud service system 190.

Mobile device 100 has access to cloud service system 190 and one or more storage devices 110. Mobile device 100 is described in detail in FIG. 2A.

Storage device 110 may be implemented in mobile device 100 and may be a part of mobile device 100. However, in other embodiments, storage device 110 may be a remote storage device that is communicatively coupled to cloud service system 190 and managed by cloud service system 190.

Cloud service system 190 may be configured to collect form document data of form document 150, process the form document data, retrieve personal information of a user of mobile device 100, and generate filled form document data of a filled form document 160.

In an embodiment, cloud service system 190 comprises various modules and components. Non-limiting examples of such modules and components include an interface module 612, a communications module 615, and an auto-fill application 616. Other embodiments may include only some of the above modules and components. Yet other embodiments may include additional modules or components not depicted in FIG. 6.

Interface module 612 may be a web-based application configured to generate and cause displaying on mobile device 100 series of graphical displays, each of which may provide a user with choices, and each of which may be configured to accept the user's selection and to communicate the user's selections to cloud service system 190. For example, interface module 612 may be configured to cause displaying on a display of mobile device 110 a menu items including names of various form documents, and provide the user with the ability to select a particular form document from the menu.

Communications module 615 may be configured to facilitate communications between various components of cloud service system 190 and devices communicating with cloud service system 190. Communications module 615 may implement various communications protocols, including the Transmission Control Protocol (TCP), the Internet Protocol (IP), the Bluetooth Protocol, and other protocols.

Auto-fill application 616 may include various modules and components. Examples of the modules and components include a form data module 617, a personal data module 620, an auto-fill module 618, and a data management module 619. Other embodiments may include only some of the above modules and components. Yet other embodiments may include additional modules or components not depicted in FIG. 6.

Form data module 617 may be configured to collect form document data for form document 150. For example, form data module 617 may receive a request to store form document data in storage device 110. The form document data may be directly transmitted to form data module 610. Alternatively, a link to storage space containing the form document data may be provided.

In an embodiment, form data module 617 may receive image data of form document 150. Upon receiving the image data, form data module 617 may initiate OCR processing of the image data, and receive form document data generated from the image data of form document 150. Form data module 617 may initiate the OCR processing by invoking OCR-enabled application executed within cloud service system 190. Alternatively, form data module 610 may transmit the image data to another center or system and delegate performing of the OCR processing by another center.

Form data module 617 may also be configured to retrieve form document data of form document 150. For example, form document module 617 may receive a request from a user of mobile device 100 to provide form document data of form document 150.

In an embodiment, form document module 617 may receive a request from a patient, who uses mobile device 100, to provide form document data of a new-patient registration form. The request may include a form identifier of the new-patient registration form, a hospital identifier of a hospital from which the patient seeks services, geographical location information of the patient, or any other data that form data module 617 may use to determine the form document data.

Upon receiving a request containing a service provider identifier, form data module 617 may use a mapping between service provider identifiers and a plurality of form document identifiers. If more than one form identifiers are associated with the particular service provider identifier, then form data module 617 may cause displaying on mobile device 100 a notification or a menu itemizing the form identifiers, and prompt the user to select one or more form identifiers from the menu. Upon receiving the selection of a particular form identifier, form data module 617 may use the selection and a mapping between the form identifiers and the respective form document data, identify the particular form document data, retrieve the particular form document data, and download it to mobile device 100.

Upon receiving a request containing geographical location information of a user of mobile device 100, form data module 617 may use the user's geographical location information to determine in which service provider facility the user is present. Once a particular service provider facility is determined, a particular identifier of the service provider facility may be determined. The particular identifier may be used to determine form document identifiers of the form documents that the particular service provider is using, and then form document data for the form documents.

Furthermore, form data module 617 may be configured to parse form document data into data information components. For the data information components, form data module 617 may identify data text labels, data text fields, and data text field locations associated with the data text labels. For example, form data module 617 may be configured to parse form document data of form document 150, and identify in the form data information components, such as a first name, a last name, an address, a social security, and so forth. The parsing process is described in detail in FIG. 2C (field recognition module 117)

Personal data module 620 may be configured to store, manage and retrieve personal information of a user. For example, personal data module 620 may receive a request from a patient, who uses mobile device 100, to store personal information for the patient. The request may include a user identifier, a Uniform Resource Locator (URL) or a link to a webpage that stores personal information of the user. Upon receiving the request, personal data module 620 may retrieve personal information stored at a storage space identified by the URL, and store the personal information in storage device 110, or other storage associated with cloud service system 190. Personal data module 620 may use the user identifier to index a database that is used to store the personal information of the user.

Personal data module 620 may also receive a request for retrieving personal information for a patient. The request may be received from a user of a mobile device, from an auto-fill module 618 of auto-fill application 616, or other application configured to retrieve personal information of a patient.

Upon receiving a request for retrieving personal information of a user, personal data module 620 may access a particular storage space containing the personal information of the user, retrieve the personal information, and transmit the personal information to mobile device 100. Alternatively, personal data module 620 may transmit the personal information to storage device 110, or other storage facility from which the user may retrieve the personal information.

Auto-fill module 618 may be configured to process requests for auto-filling form documents. For example, auto-fill module 618 may receive a request from a user, who uses mobile device 100, to fill in a form document 150. The request may include a form identifier (or any other information that may be used to identify the form document), and a user identifier (or any other information that may be used to identify the user). In response to receiving the request, auto-fill module 618 may transmit the form identifier to form data module 617, and cause form data module 617 to download form document data of a form document identified by the form identifier.

Furthermore, auto-fill module 618 may transmit the user identifier to personal data module 620, and cause personal data module 620 to download personal information for the user identified by the user identifier.

Upon receiving both form document data and user personal information, auto-fill module may fill in a form document using the user personal information. The process of filling in a form document is described in detail in FIG. 2C.

Upon filling in the form, cloud service system 190 may transmit the filled form document data to mobile device 110, or directly to service provider, or store the filled form document data in storage device 110.

Data management module 619 may be configured to maintain one or more databases for storing various types of data records. For example, data management module 619 may be configured to store user personal information, form document data and filled form document data for users.

Upon acquiring personal information for a user, data management module 619 may store the user personal information, generate one or more indexes for the stored information, and index the stored information using the generated indexes.

Upon acquiring form document data for form document 150, database management module 619 may store the acquired form document data, generate one or more indexes for the stored information, and index the data using the generated indexes.

Data management module 619 may also maintain geographical location information of service providers for who form document data is stored in the database. Therefore, the database may be searchable not only using form identifiers or the service provider identifiers, but also using geographical location information. For example, a user may provide their geographical location information, and the user's geographical location information may be used to determine in which service provider facility the user is present. Once a particular service provider facility is determined, a particular identifier of the service provider facility may be determined. The particular identifier may be used to determine form document identifiers of the form documents that the particular service provider is using.

FIG. 6 also depicts an additional cloud service system 191, a storage device 182, a server device 184, and a printing device 180. Cloud service system 191 configured similarly to cloud service system 190, and provides additional services to cloud service system 190. Storage device 182, server device 184, and printing device 180 are described in detail in FIG. 2C.

3.2 Form Auto-Filling Using a Cloud Service

Figure 7:
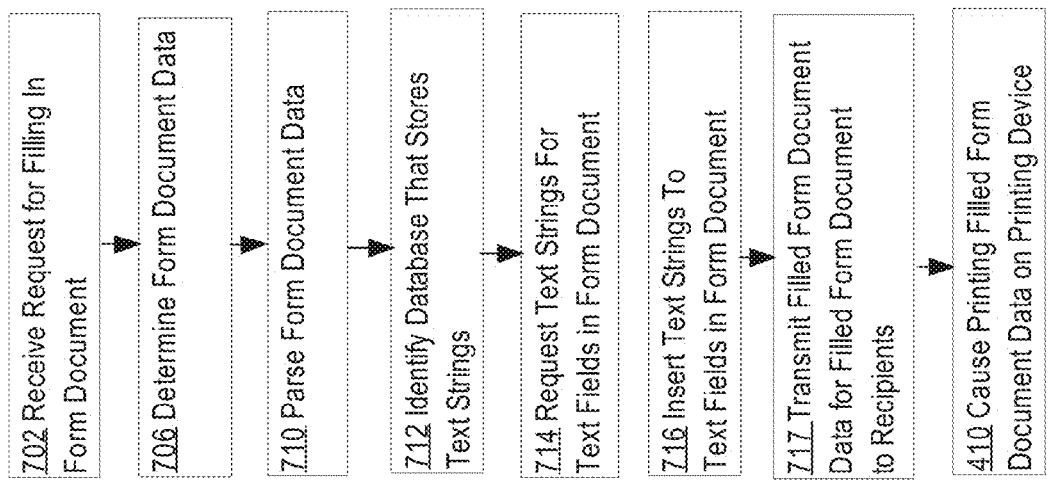
FIG. 7 is a flow diagram that depicts an approach for form auto-filling using a cloud service.

FIG. 7 is a flow diagram that depicts an approach for form auto-filling using a cloud service. In step 702, a cloud service system receives a request for filling in a form document.

In step 706, a cloud service system determines form document data for the form document. The determination may be performed based on, at last in part, parsing contents of the request.

In an embodiment, the contents of the request may comprise a form document identifier. If the contents comprise the form document identifier, then the form document identifier may be used to determine the form document, and the corresponding form document data of the form document.

If the contents comprise an entity identifier, then a mapping between a plurality of entity identifiers and a plurality of form document identifiers may be identified, and using the mapping and the entity identifier, the form document data of the form document used by the identified entity may be determined and retrieved.

If the contents comprise geographical location information, then a mapping between the geographical location information and the plurality of form document identifiers may be identified. Using the mapping, the form document identifier for the form document data may be determined. Then, using the form document identifier, the form document and the corresponding form document data may be determined and retrieved.

In step 710, a cloud service system parses the form document data of the form document to extract one or more data information components.

In an embodiment, each data information component, of the one or more data information components, comprises one or more of: a data text label, a data text field, and a data text field location. The data text field location indicates a location of the data text field on the form document. The data text field is labelled with the data text label and is to be filled with a text string.

In step 712, a cloud service system identifies a personal information database that stores one or more text strings in association with one or more data text labels. The personal information database may be identified based on the contents of the request. For example, the request may include a user identifier, a personal information database identifier, or any other identifier that may be useful in determining the personal information database.

In step 714, a cloud service system requests text strings for text fields in the form document. For example, the cloud service system may use the data text labels of the data information components identified in the form document data, and request the corresponding text strings from the personal information database that correspond to the data text labels.

In step 716, a cloud service system generates filled form document data of a filled form document. This may accomplished by performing the following: for each data information component, of the one or more data information components of the form document, having the associated data text label: based on, at least in part, the associated data text label, retrieving, from the personal information database, the text string that is associated with the data text label; and inserting the text string into the data text field of the data information component at the data text field location.

In step 717, a cloud service system transmits the filled form document data for filled form document to one or more recipients. For example, the cloud service system may transmit the filled form document data to a mobile device, to a storage device associated with the cloud service system, a hospital server, a hospital reception server, or other device or system. Furthermore, the cloud service system may transmit the filled form document data to a printing device, a multifunction printing device (MFP), a server system, a cloud system, or a display device.

In step 410, a cloud service system causes printing filled form document data on a printing device. This step was described in detail in FIG. 5.

In an embodiment, a cloud service system may also receive requests for entering personal information of a user into a database. If a request for entering the personal information into the database is received, then the cloud service system may parse the request, and determine whether the request comprises a user identifier. In response to determining that the request comprises the user identifier, the cloud service system may use the user identifier to determine a personal information database that has been created for the user. Then, the personal information is received from the user and included in the personal information database.

If a request for entering personal information into a database comprises a personal database identifier, then the personal database identifier is used to identify the personal information database for the user. Then, the received personal information of the user is included in the personal information database.

Personal information database may be implemented in a variety of devices. For example, the personal information database may be implemented as a local database that is locally accessible to a cloud service, a remote database that is remotely accessible to the cloud service, a server database that is accessible to the cloud service via a server computer, or a cloud system database that is accessible to the cloud service via a cloud service.

Cloud service system may also be configured to aggregate personal information stored in various user profiles, and verify data consistency between the data profiles for a user. For example, the cloud service system may acquire one or more user profiles created for a user, parse each of the one or more user profiles to determine a plurality of label-string pairs. Each label-string pair, of the plurality of label-string pairs, may comprise a pair text label and a pair text string. Furthermore, the cloud service system may determine whether any two label-string pairs, of the plurality of label-string pairs, comprise the same pair text label, but different pair text strings. If so, then one of the two label string pairs may be selected, and another label-string pair of the two label-string pairs may be deleted. The decision which pairs are to be deleted may be made by requesting and receiving input from the user. The remaining label-string pairs may be stored in a personal information database.

Cloud service system may also be configured to determine whether a personal information database is incomplete. For example, the cloud service system may determine whether, for a particular data information component, of the one or more data information components stored in the personal information database, a particular data text label is stored in the database, but no corresponding text string is stored in the database. If so, then the cloud service system may generate and display for a user a notification indicating that no text string is available for the particular data text label for the particular data information component. Such a notification may alert the user, and prompt him to provide the text string for the particular data text label.

3.3 Example Process Flow

Figure 8:
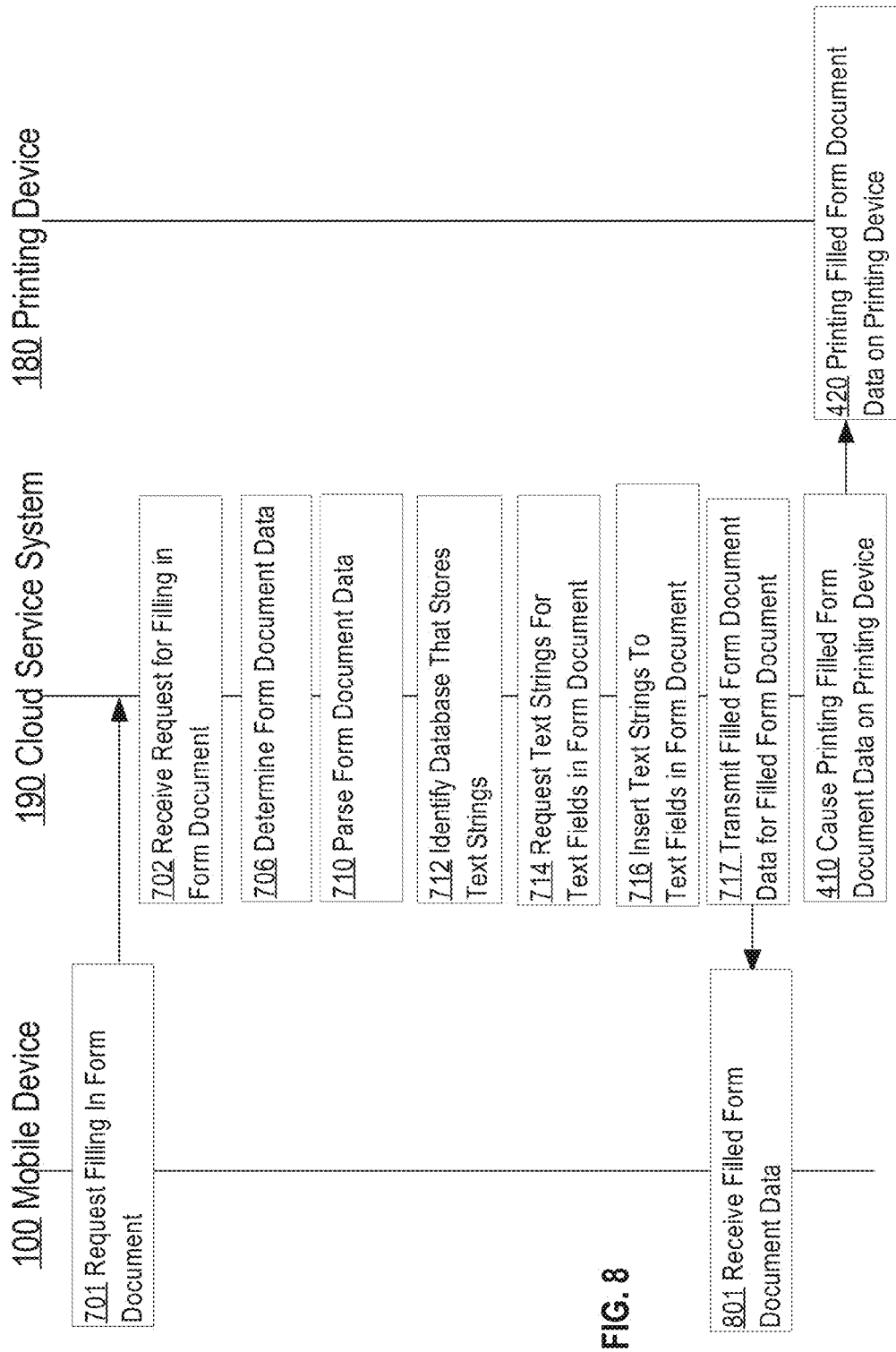
FIG. 8 is a block diagram that depicts communications between devices implementing a form auto-filing approach.

FIG. 8 is a block diagram that depicts communications between devices implementing a form auto-filing approach. In the depicted example, mobile device 100 communicates with cloud service system 190, which implements a form auto-filling approach, and communicates with printing device 180.

In step 701, a mobile device application of mobile device 100 requests filling in a form document. The mobile device application may send a request to cloud service system 190 using a variety of communications methods, including a message, an email, a text message, and others. The request may include specifying the form document, a user identifier, and other information.

In step 702, a cloud service system 190 receives a request for filling in a form document. Upon receiving the request, cloud service system 190 may use the contents of the request to determine form document data for the form document. Step 702 is described in detail in FIG. 7.

Subsequently, a cloud service system 190 proceeds to performing steps 706, 710, 712, 714, 716, and 717, each of which is described in detail in FIG. 7.

Upon transmitting filled form document data for a filled form document to mobile device 100, in step 801 mobile device 100 receives the filled form document, and stores or causes printing the filled form document data.

In step 410, a cloud service system 190 causes printing filled form document data on a printing device. This step was described in detail in FIG. 5.

There are many benefits of implementing a form auto-filling approach in cloud service system 190. For example, using cloud service system 190, the form filling process may be performed accurately and effortlessly. The automated approach allows filling in the forms even if they require very detailed information, some of which may not be readily available to a user. Furthermore, using the automated fill-in approach allows filling in the forms accurately, and thus avoiding the pitfalls of the manual approach. For example, typographical errors on the forms may be avoided.

Figure 9:
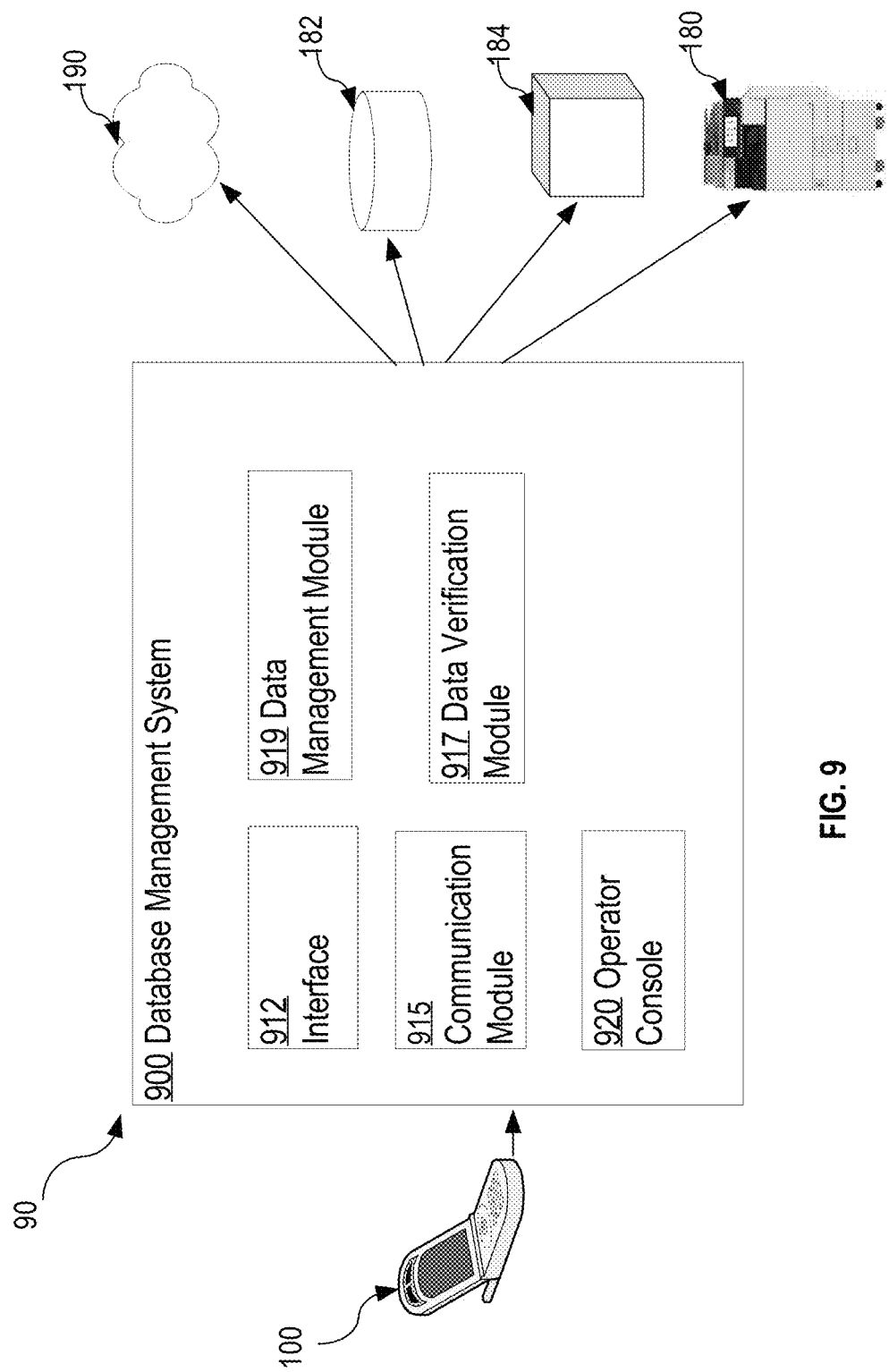
FIG. 9 is a block diagram that depicts an example arrangement for a database management system implementing a form auto-filling approach.

4.0 Database Management System for Form Auto-Filling 4.1 Database Management System Architecture FIG. 9 is a block diagram that depicts an example arrangement 90 for database management system 900 implementing a form auto-filling approach. Presented embodiments are not limited to the example arrangement 90 depicted in FIG. 9, and other example arrangements are described hereinafter.

In the example depicted in FIG. 9, arrangement 90 includes database management system 900, mobile device 100, cloud service system 190, and various storage devices, printers and systems cooperating with database management system 900. Non-limiting examples of the storage devices include a storage device 182 and a server device 184. Storage device 182, server device 184 and a printing device 180 are described in detail in FIG. 2C. Mobile device 100 is described in detail in FIG. 2A. Cloud service system 190 is described in detail in FIG. 6.

In an embodiment, database management system 900 comprises various modules and components. Non-limiting examples of such modules and components include an interface module 912, a communications module 915, a data management module 919, and a data verification module 917. Other embodiments may include only some of the above modules and components. Yet other embodiments may include additional modules or components not depicted in FIG. 9.

Database management system 900 may also include an operator console 920, and configured to execute one or more software applications designed to communicate data to and from operator console 920.

Interface module 912 may be a web-based application configured to generate and cause displaying on operator console 920 series of graphical displays, each of which may provide a user with choices, and each of which may be configured to accept the user's selection and to communicate the user's selections to database management system 900. For example, interface module 912 may be configured to cause displaying on operator console 920 a menu items including names of various form documents, and provide the user with the ability to select a particular form document from the menu.

Communications module 915 may be configured to facilitate communications between various components of database management system 900 and devices communicating with database management system 900. Communications module 915 may implement various communications protocols, including the Transmission Control Protocol (TCP), the Internet Protocol (IP), the Bluetooth Protocol, and other protocols.

Data management module 919 may be configured collect form document data for form documents. For example, data management module 919 may receive a request to store form document data in storage device 182. The form document data may be directly transmitted to data management module 919. Alternatively, a link to storage space containing the form document data may be provided.

Data management module 919 may be configured to store, manage and retrieve personal information of a user. For example, data management module 919 may receive a request from a patient, who uses mobile device 100, to store or retrieve personal information for the patient. The request may include a user identifier, a Uniform Resource Locator (URL) or a link to a webpage that stores personal information of the user. Upon receiving the request, data management module 919 may store the personal information of the user at a storage space identified by the URL, or retrieve the personal information from the storage space identified by the URL, and download the personal information to mobile device 100.

Data management module 919 may also be configured to store, manage and retrieve form document data of form documents. For example, data management module 919 may receive a request from a user of mobile device 100 to provide form document data of a new-patient registration form The request may include a form identifier of the new-patient registration form, a hospital identifier of a hospital from which the patient seeks services, geographical location information of the patient, or any other data that data management module 919 may use to determine the form document data.

Upon receiving a request containing a service provider identifier, data management module 919 may use a mapping between service provider identifiers and a plurality of form document identifiers, and, as it was described above, retrieve the form document data, and download it to mobile device 100.

Upon receiving a request containing geographical location information of a user of mobile device 100, data management module 919 may use the user's geographical location information to determine in which service provider facility the user is present. Once a particular service provider facility is determined, data management module 919 may determine a particular identifier of the service provider facility, then a form document identifier of the new-patient registration form, and then retrieve and download the form document data for the new-patient registration form.

Data management module 919 may further be configured to maintain one or more databases for storing various types of data records. For example, data management module 919 may be configured to maintain a user personal information database, a form document database, a filled form document database, and other databases used by database management system 900.

Upon acquiring personal information for a user, data management module 919 may store the user personal information, generate one or more indexes for the stored information, and index the stored information using the generated indexes.

Upon acquiring form document data for form document 150, data management module 919 may store the acquired form document data, generate one or more indexes for the stored information, and index the data using the generated indexes.

Data management module 919 may also maintain geographical location information of service providers for who form document data is stored in the database. Therefore, the database may be searchable not only using form identifiers or the service provider identifiers, but also using geographical location information. For example, a user may provide their geographical location information, and the user's geographical location information may be used to determine in which service provider facility the user is present. Once a particular service provider facility is determined, a particular identifier of the service provider facility may be determined. The particular identifier may be used to determine form document identifiers of the form documents that the particular service provider is using.

Data verification module 917 may be configured to determine data consistency for user profiles, form document data and other data stored in databases managed by database management system 900. For example, data verification module 917 may determine whether, for a particular data information component, of one or more data information components, different data strings are stored in the database, or whether no data string is stored in the database. If no data string is stored in the database for a particular data information component, data verification module 917 may generate a notification indicating the issue, and cause transmitting the notification to mobile device 100. If different data strings are stored in the database for the same data information component, data verification module 917 may generate an error notification, and cause transmitting the error notification to mobile device 100.

4.2 Example Process Flow

Database management system supporting a form auto-fill approach may receive various requests from various entities. For example, the database management system may receive requests from users who ask for assistance in creating user profiles, for retrieving form document data, or for retrieving user personal information. The database management system may also receive requests from a cloud service system for assistance in storing user personal information, storing form document data for form documents, retrieving user personal information, retrieving form document data, and assistance in maintaining various databases supporting the auto-fill approach. Furthermore, the database management system may receive requests from service providers to store patient records, store form document data that the service providers are using, store filled form document data filled by the users or patients, and for assisting in maintaining various databases storing data specific to the service providers.

In an embodiment, a database management system receives a request for entering personal information of a user to a personal information database. The database management system may parse contents of the request and determine whether the contents comprise a user identifier. If so, then the database management system may use the user identifier to identify the personal information database for the user. Upon receiving the personal information from the user, the database management system may include the personal information in the personal information database.

In an embodiment, a database management system receives a request for entering personal information of a user to a personal information database, and determines that the request comprises a personal database identifier of the user. In response to determining that the request comprises the personal database identifier, the database management system may use the personal database identifier to identify the personal information database for the user. Upon receiving the personal information from the user, the database management system may include the personal information in the personal information database.

In an embodiment, a database management system receives a request for entering form document data of a form document. The database management system may parse the request and determine that the request comprises a form document identifier. Using the form document identifier, the database management system may identify a form document database indexed by the form document identifier. Upon receiving the form document data of the form document, the database management system may include the form document data in the form document database.

In an embodiment, a database management system receives a request for entering personal information of a user to a personal information database, and determines that the request comprises an entity identifier. In response to determining that request comprises the entity identifier, the database management system may identify a mapping between a plurality of entity identifiers and a plurality of form document identifiers. Using the mapping, the database management system may determine the form document identifier for the form document data, and using the form document identifier, the database management system may determine the form document database. Upon receiving the form document data of the form document, the database management system may include the form document data in the form document database.

In an embodiment, a database management system receives a request for entering personal information of a user to a personal information database, and determines that the request comprises geographical location information of a user. In response to determining that the request comprises the geographical location information, the database management system may identify a mapping between the geographical location information and the plurality of form document identifiers. Using the mapping, the database management system may determine a form document identifier for the form document data, and using the form document identifier, determine the form document database. Upon receiving the form document data of the form document, the database management system may include the form document data in the form document database.

In an embodiment, a database management system receives a request for retrieving personal information of a user from a personal information database, and determines that the request comprises a user identifier. The database management system may use the user identifier to identify the personal information database for the user, and retrieve the personal information of the user from the personal information database.

In an embodiment, a database management system receives a request for retrieving personal information of a user from a personal information database, and determines that the request comprises a personal database identifier. The database management system may use the personal database identifier to identify the personal information database for the user, and retrieve the personal information of the user from the personal information database.

In an embodiment, a database management system receives a request for retrieving form document data of a form document, and determines that the request comprises a form document identifier. The database management system may use the form document identifier to identify the form document database containing the form document data for the form document, and retrieve the form document data from the form document database.

In an embodiment, a database management system receives a request for retrieving form document data of a form document, and determines that the request comprises and entity identifier. The database management system may identify a mapping between a plurality of entity identifiers and a plurality of form document identifiers, and use the mapping to determine a form document identifier for the form document data. Then, using the form document identifier, the database management system may determine a form document database, and retrieve the form document data from the form document database.

In an embodiment, a database management system receives a request for retrieving form document data of a form document, and determines that the request comprises geographical location information of a user. The database management system may identify a mapping between the geographical location information and a plurality of form document identifiers, and use the geographical location information and the mapping to determine a form document identifier for the form document data. Then, using the form document identifier, the database management system may retrieve the form document data from the form document database.

In an embodiment, a database management system uses one or more databases, including personal information databases, form document databases, filled form document databases, mappings, and the like. The databases may be implemented at one or more of: a local database that is locally accessible to the data management system, a remote database that is remotely accessible to the data management system, a server database that is accessible to the data management system device via a server computer, or a cloud system database that is accessible to the document management system via a cloud service.

Database management system may also be configured to verify data consistency of data stored in a database used for an auto-fill approach. For example, a database management system may be configured to acquire one or more user profiles created for a user of a cloud service. The database management system may parse each of the one or more user profiles to determine a plurality of label-string pairs. Each label-string pair, of the plurality of label-string pairs, may comprise a pair text label and a pair text string. Upon determining that two label-string pairs, of the plurality of label-string pairs, comprise the same pair text label, but different pair text strings, the database management system may select and store one of the two label string pairs and delete another label-string pair of the two label-string pairs.

4.3 Example User Interface

Figure 10:
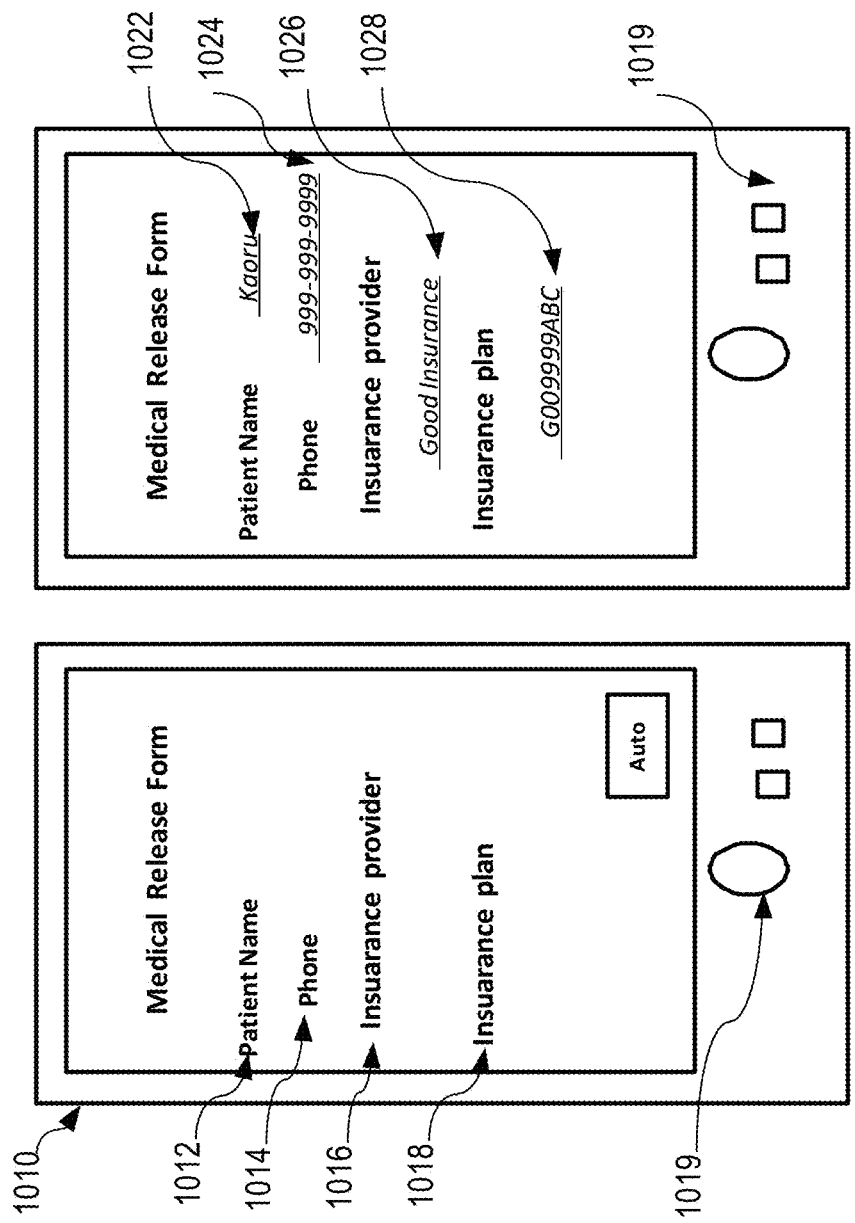
FIG. 10 depicts an example of a user interface implemented for a database management system.

FIG. 10 depicts an example of a user interface 1010 implemented for a database management system. User interface 1010 may be implemented in mobile device 100. In other implementations, user interface 1010 may be implemented in a personal computer, a lap top, or other computer device.

In the depicted example, user interface 1010 is configured to display a form title ("Medical Release Form"), and a plurality of data information components, such as a patient name 1012, a phone 1014, an insurance provider 1016, an insurance plan 1018, and other components (not depicted in FIG. 10).

Using keyboard buttons 1019, dials and other entry media or devices, a user may select data information components, and enter text strings into data fields associated with the data information components. For example, using keyboard buttons 1019, a user may enter into a medical release form a patient name text string 1022, a patient phone number text string 1024, a patient insurance provider name text string 1028 and a patient insurance plan text string 1028, and cause generating filled form document data of the release form.

Figure 11:
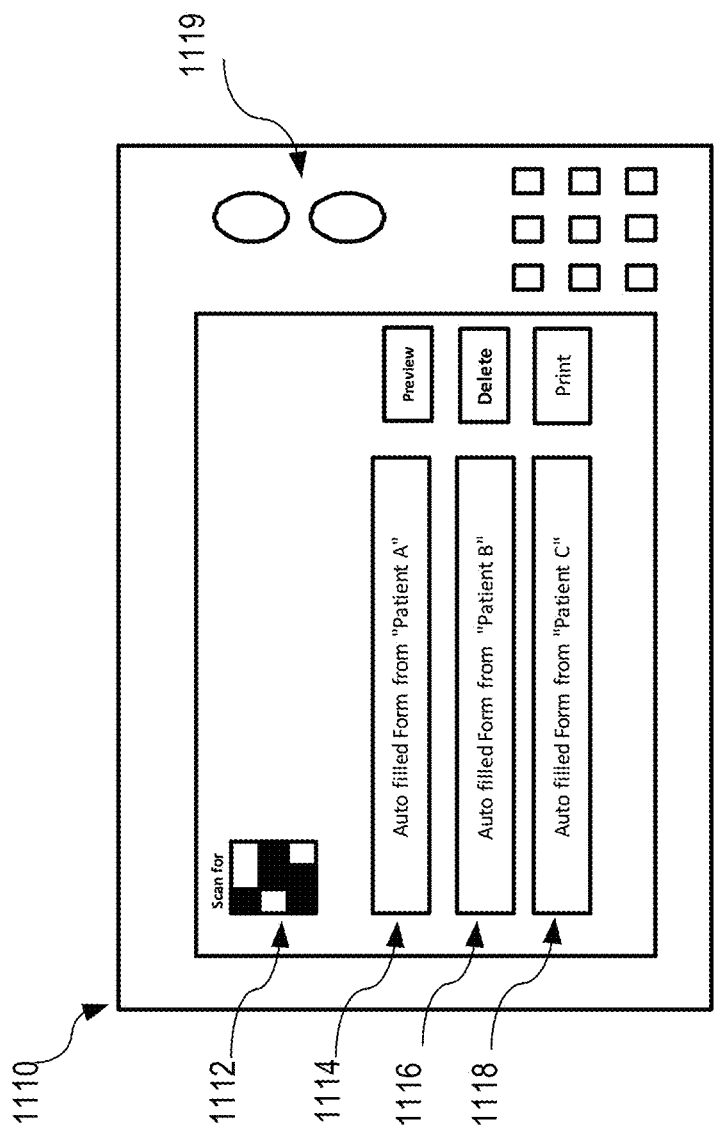
FIG. 11 is an example of a user interface for a database management system.

FIG. 11 is an example of a user interface 1110 for a database management system. User interface 1110 may be implemented in mobile device 100. In other implementations, user interface 1110 may be implemented in a personal computer, a lap top, or other computer device.

In the depicted example, user interface 1110 is used to facilitate storing auto-filled forms of users. For example, user interface 1110 may display a QR code 1112 that contains an encoded URL address to a database that stores filled form document data for the users. User interface 1110 may also display a menu comprising several menu items, including an Auto Filled Form From "Patient A," an Auto Filled Form From "Patient B," and an Auto Filled Form From "Patient C." Using keyboard buttons 1119, dials and other entry media/devices, an operator may select a particular filled form document, preview the filled form document data, delete the filled form document, or print the filled form document data.

Figure 12:
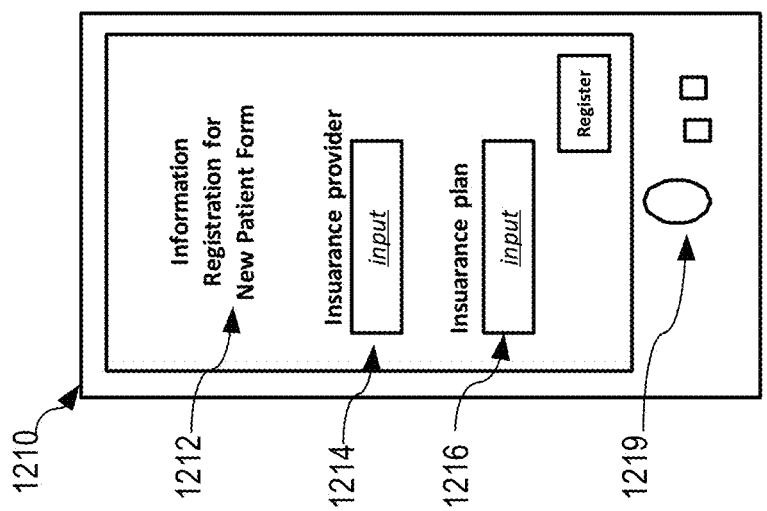
FIG. 12 is an example of a user interface for a database management system.

FIG. 12 is an example of a user interface 1210 for a database management system. User interface 1210 may be implemented in mobile device 110, or other computer devices. User interface 1210 may allow entering user personal information in a new-patient registration form 1212 using an auto-fill approach. For example, by scanning a QR code (not depicted in FIG. 12) that contains an encoded URL address of a database that stores user personal information, an operator may initiate an auto-fill process of a new-patient form, and cause an automatic filling in of an insurance provider name 1214, an insurance plan identifier 1216, and so forth. If some of the data is unavailable, a user may enter the data using keyboard buttons 1219.

4.4 Example Data Records

Figure 13:
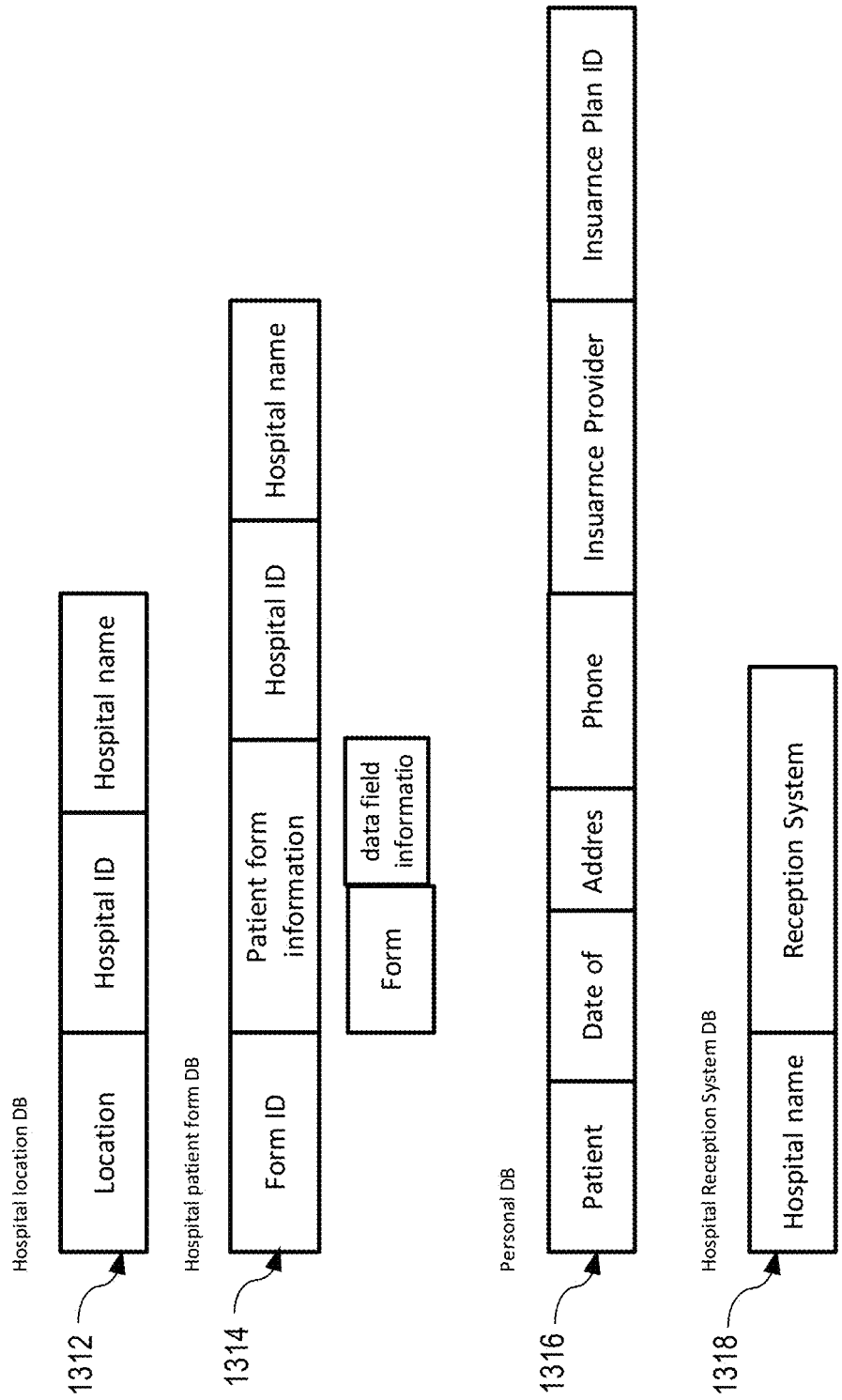
FIG. 13 depicts examples of data records for a database management system.

FIG. 13 depicts examples of data records for a database management system. In healthcare implementations, a database management system may maintain one or more databases, including for example, a hospital location database 1312, a hospital patient form database 1314, a personal database 1316, a hospital reception database 1318, and other databases related to providing healthcare services. Each of the databases may be organized using a variety of approaches, and may be configured to store a variety of data records. The examples of data records depicted in FIG. 13 are provided to merely illustrate various data records.

In an embodiment, a hospital location database 1312 stores data records that include location data fields, hospital identification fields, hospital name fields, and other data fields.

In an embodiment, a hospital patient form database 1314 stores data records that include form identifier fields, patient form information fields, hospital identification fields, hospital name fields, form identifier fields, data information fields, and other data fields.

In an embodiment, a personal database 1316 stores data records that include patient name fields, data of birth data fields, address fields, phone number fields, insurance provider name fields, insurance plan identifier fields, and other data fields.

In an embodiment, a hospital reception database 1318 stores data records that include hospital name fields, reception system identifier fields, and other data fields.

Data records for databases maintained by a database management system may be generated automatically. For example, the data records may be generated based on filled form document data provided by patients or receptionists of healthcare service providers. Alternatively, patient personal data may be ported from a cloud service system.

Database management systems provide users and service providers with convenience and efficiency in processing form documents. Data stored in a databases maintained by a database management system may be used to automatically fill in the form documents. The data may be filled in accurately, efficiently and expeditiously.

5.0 Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 14:
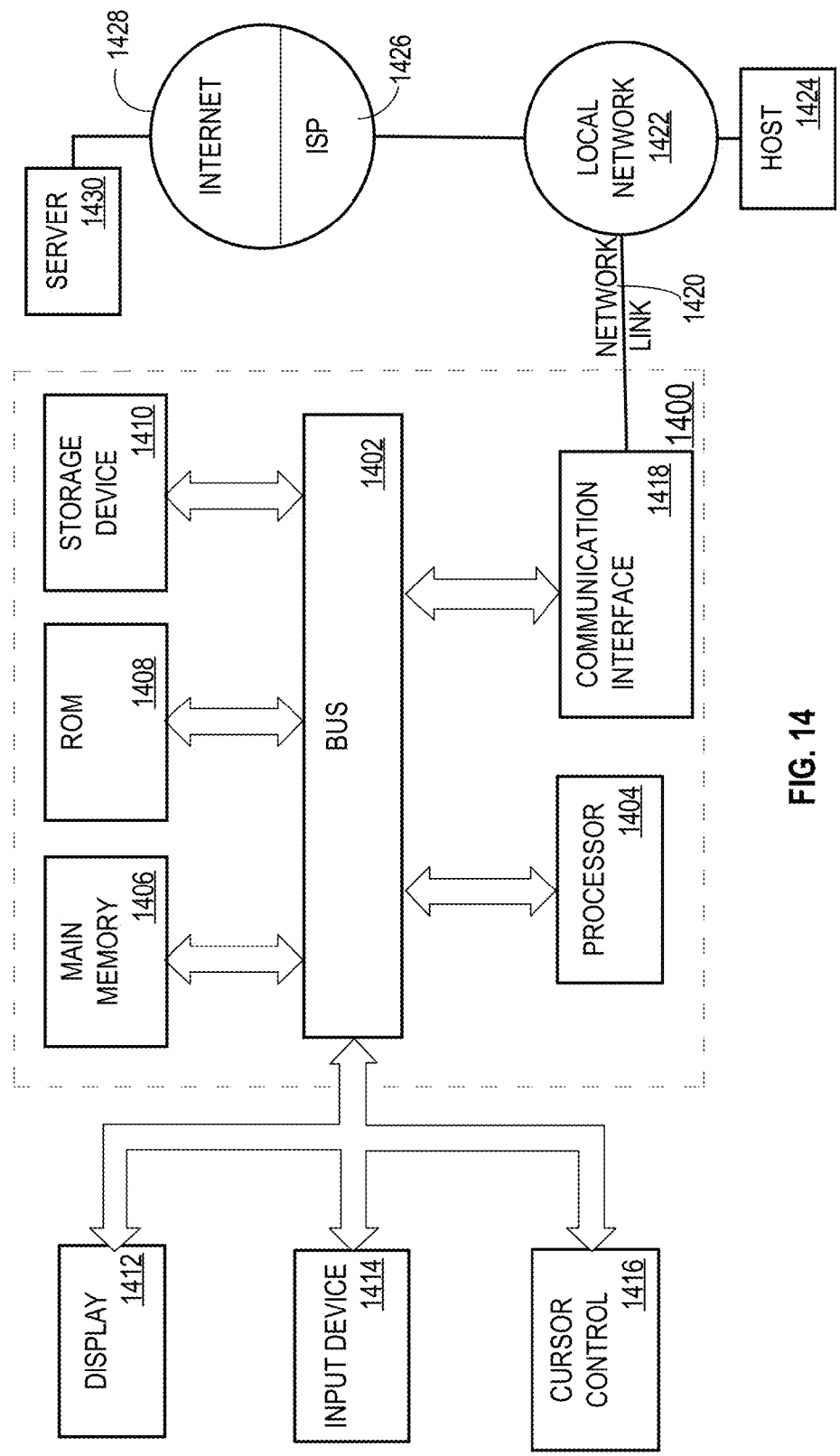
FIG. 14 is a block diagram of a computer system on which embodiments may be implemented.

For example, FIG. 14 is a block diagram that illustrates a computer system 1400 upon which an embodiment may be implemented. Computer system 1400 includes a bus 1402 or other communication mechanism for communicating information, and a hardware processor 1404 coupled with bus 1402 for processing information. Hardware processor 1404 may be, for example, a general purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1410. Volatile media includes dynamic memory, such as main memory 1406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

What is claimed is:

1. A cloud service device, comprising:
   one or more processors; and
   one or more memories storing instructions which, when processed by the one or more processors, cause the cloud service device to perform:
   receiving a first request, wherein the first request is for filling in a form document, and wherein the first request comprises first contents;
   parsing the first contents of the first request to generate parsed information;
   based on the parsed information, determining whether the first contents comprise geographical location information of a user for whom the first request was sent;
   in response to determining that the first contents comprise the geographical location information of the user:
     determining, based on the geographical location information of the user, a particular service provider;
     based on the particular service provider, determining a particular service provider identifier that identifies the particular service provider;
     based on the particular service provider identifier, determining a form document identifier that identifies form document data which represents the form document that the particular service provider is using;
     based on the form document identifier:
       retrieving the form document data that represents the form document;
       parsing the form document data of the form document to identify, in the form document data, one or more data information components;
       wherein each data information component, of the one or more data information components identified in the form document data, comprises: a data text label, a data text field, and a data text field location, wherein the data text label, identified in the form document data, is depicted in the form document as adjacent to the data text field, wherein the data text field, identified in the form document data, is depicted in the form document at the data text field location, wherein the data text field location, identified in the form document data, indicates a location of the data text field on the form document, and wherein the data text field is labelled with the data text label and is to be filled with a text string;

identifying a first personal information database that contains first information for the user and that stores one or more first text strings in association with one or more first data text labels;

generating filled form document data of a filled form document by performing:

for a data information component, of the one or more data information components of the form document, having a data text label, a data text field, and a data text field location:

based on, at least in part, the data text label, determining whether the first personal information database contains the data text label and a data text string that is associated with the data text label, and if it does, retrieving, from the first personal information database, the data text string that is associated with the data text label; and inserting, in the filled form document, the data text string into the data text field, which is adjacent to the data text label of the data information component, at the data text field location;

determining that one or more data text fields in the filled form document have not been filled in using information stored in the first personal information database; and in response to determining that the one or more data text fields in the filled form document have not been filled in using the information stored in the first personal information database:

identifying one or more second data text labels that are associated with the one or more data text fields that have not been filled in the filled form document using the information stored in the first personal information database;

identifying a second personal information database that contains second information for the user and that stores the one or more second data text labels and one or more second data text strings that are associated with the one or more second data text labels, and inserting, into the one or more data text fields in the filled form document, the one or more second text strings that are associated with the one or more second data text labels to complete filling in the filled form document.

2. The cloud service device of claim 1, wherein the one or more memories store additional instructions which, when processed by the one or more processors, cause the cloud service device to perform:

determining whether the first contents comprise an entity identifier;

in response to determining that the first contents comprise the entity identifier:

identifying a mapping between a plurality of entity identifiers and a plurality of form document identifiers;

using the mapping, determining the form document identifier for the form document data;

using the form document identifier, determining the form document identified by the form document identifier; and retrieving the form document data of the form document;

determining whether the first contents comprise the geographical location information;

in response to determining that the first contents comprise the geographical location information:

identifying a mapping between the geographical location information and the plurality of form document identifiers;

using the mapping, determining the form document identifier for the form document data;

using the form document identifier, determining the form document identified by the form document identifier; and retrieving the form document data of the form document.

3. The cloud service device of claim 1, storing additional instructions which, when processed by the one or more processors, cause the cloud service device to perform:

receiving a second request, wherein the second request is for entering personal information of a user;

parsing second contents of the second request;

determining whether the second contents comprise a user identifier;

in response to determining that the second contents comprise the user identifier:

using the user identifier, identifying the personal information database identified by the user identifier;

receiving the personal information from the user; and including the personal information in the personal information database;

determining whether the second contents comprise a personal database identifier;

in response to determining that the second contents comprise the personal database identifier:

using the personal database identifier, identifying the personal information database identified by the personal database identifier;

receiving the personal information from the user; and including the personal information in the personal information database.

4. The cloud service device of claim 1, wherein the personal information database is implemented at one or more of:

a local database that is locally accessible to the cloud service device;

a remote database that is remotely accessible to the cloud service device;

a server database that is accessible to the cloud service device via a server computer; or a cloud system database that is accessible to the cloud service device via a cloud service.

5. The cloud service device of claim 1, wherein the one or more memories store additional instructions which, when processed by the one or more processors, cause the cloud service device to perform:

transmitting the filled form document data to a system device;

wherein the system device comprises any one of: a printing device, a multifunction printing device (MFP), a server system, a cloud system, a display device.

6. The cloud service device of claim 1, wherein the one or more memories store additional instructions which, when processed by the one or more processors, cause the cloud service device to perform:

acquiring one or more user profiles created for a user of the cloud service device;

parsing each of the one or more user profiles to determine a plurality of label-string pairs;

wherein each label-string pair, of the plurality of label-string pairs, comprises a pair text label and a pair text string;

determining whether any two label-string pairs, of the plurality of label-string pairs, comprise the same pair text label, but different pair text strings, and in response thereto, selecting one of the two label string pairs and deleting another label-string pair of the two label-string pairs; and storing, in the personal information database, the remaining label-string pairs.

7. The cloud service device of claim 1, wherein the one or more memories store additional instructions which, when processed by the one or more processors, cause the cloud service device to perform:

determining whether, for a particular data information component, of the one or more data information components, a particular data text label is stored in the database;

determining whether, for the particular data text label, a particular text string is stored in the database; and in response to determining that, for the particular data text label, no particular text string is stored in the database, generating and displaying a notification indicating that no particular text string is available for the particular data information component.

8. A non-transitory computer-readable storage medium storing one or more instructions which, when processed by one or more processors, cause the one or more processors to perform:

receiving a first request, wherein the first request is for filling in a form document, and wherein the first request comprises first contents;

parsing the first contents of the first request to generate parsed information;

based on the parsed information, determining whether the first contents comprise geographical location information of a user for whom the first request was sent;

in response to determining that the first contents comprise the geographical location information of the user:

determining, based on the geographical location information of the user, a particular service provider;

based on the particular service provider, determining a particular service provider identifier that identifies the particular service provider;

based on the particular service provider identifier, determining a form document identifier that identifies form document data which represents the form document that the particular service provider is using;

based on the form document identifier:

retrieving the form document data that represents the form document;

parsing the form document data of the form document to identify, in the form document data, one or more data information components;

wherein each data information component, of the one or more data information components identified in the form document data, comprises: a data text label, a data text field, and a data text field location, wherein the data text label, identified in the form document data, is depicted in the form document as adjacent to the data text field, wherein the data text field, identified in the form document data, is depicted in the form document at the data text field location, wherein the data text field location, identified in the form document data, indicates a location of the data text field on the form document, and wherein the data text field is labelled with the data text label and is to be filled with a text string;

identifying a first personal information database that contains first information for the user and that stores one or more first text strings in association with one or more first data text labels;

generating filled form document data of a filled form document by performing:

for a data information component, of the one or more data information components of the form document, having a data text label, a data text field, and a data text field location:

based on, at least in part, the data text label, determining whether the first personal information database contains the data text label and a data text string that is associated with the data text label, and if it does, retrieving, from the first personal information database, the data text string that is associated with the data text label; and inserting, in the filled form document, the data text string into the data text field, which is adjacent to the data text label of the data information component, at the data text field location;

determining that one or more data text fields in the filled form document have not been filled in using information stored in the first personal information database; and in response to determining that the one or more data text fields in the filled form document have not been filled in using the information stored in the first personal information database:

identifying one or more second data text labels that are associated with the one or more data text fields that have not been filled in the filled form document using the information stored in the first personal information database;

identifying a second personal information database that contains second information for the user and that stores the one or more second data text labels and one or more second data text strings that are associated with the one or more second data text labels, and inserting, into the one or more data text fields in the filled form document, the one or more second text strings that are associated with the one or more second data text labels to complete filling in the filled form document.

9. The non-transitory computer-readable storage medium of claim 8, storing additional instructions which, when processed by one or more processors, cause the one or more processors to perform:

determining whether the first contents comprise an entity identifier;

in response to determining that the first contents comprise the entity identifier:
  identifying a mapping between a plurality of entity identifiers and a plurality of form document identifiers;
  using the mapping, determining the form document identifier for the form document data;
  using the form document identifier, determining the form document identified by the form document identifier; and
  retrieving the form document data of the form document;

determining whether the first contents comprise the geographical location information;

in response to determining that the first contents comprise the geographical location information:
  identifying a mapping between the geographical location information and the plurality of form document identifiers;
  using the mapping, determining the form document identifier for the form document data;
  using the form document identifier, determining the form document identified by the form document identifier; and
  retrieving the form document data of the form document.

10. The non-transitory computer-readable storage medium of claim 8, storing additional instructions which, when processed by one or more processors, cause the one or more processors to perform:
  receiving a second request, wherein the second request is for entering personal information of a user;
  parsing second contents of the second request;
  determining whether the second contents comprise a user identifier;
  in response to determining that the second contents comprise the user identifier:
    using the user identifier, identifying the personal information database identified by the user identifier;
    receiving the personal information from the user; and
    including the personal information in the personal information database;
  determining whether the second contents comprise a personal database identifier;
  in response to determining that the second contents comprise the personal database identifier:
    using the personal database identifier, identifying the personal information database identified by the personal database identifier;
    receiving the personal information from the user; and
    including the personal information in the personal information database.

11. The non-transitory computer-readable storage medium of claim 8, wherein the database is implemented at one or more of:
  a local database that is locally accessible to a cloud service;
  a remote database that is remotely accessible to the cloud service;
  a server database that is accessible to the cloud service via a server computer; or
  a cloud system database that is accessible to the cloud service via a cloud service.

12. The non-transitory computer-readable storage medium of claim 8, storing additional instructions which, when processed by one or more processors, cause the one or more processors to perform:
  transmitting the filled form document data to a system device;
  wherein the system device comprises any one of: a printing device, a multifunction printing device (MFP), a server system, a cloud system, a display device.

13. The non-transitory computer-readable storage medium of claim 8, storing additional instructions which, when processed by one or more processors, cause the one or more processors to perform:
  acquiring one or more user profiles created for a user of a cloud service;
  parsing each of the one or more user profiles to determine a plurality of label-string pairs;
  wherein each label-string pair, of the plurality of label-string pairs, comprises a pair text label and a pair text string;
  determining whether any two label-string pairs, of the plurality of label-string pairs, comprise the same pair text label, but different pair text strings, and in response thereto, selecting one of the two label string pairs and deleting another label-string pair of the two label-string pairs; and
  storing, in the database, the remaining label-string pairs.

14. The non-transitory computer-readable storage medium of claim 8, storing additional instructions which, when processed by one or more processors, cause the one or more processors to perform:
  determining whether, for a particular data information component, of the one or more data information components, a particular data text label is stored in the database;
  determining whether, for the particular data text label, a particular text string is stored in the database; and
  in response to determining that, for the particular data text label, no particular text string is stored in the database, generating and displaying a notification indicating that no particular text string is available for the particular data information component.

15. A method, comprising:
  receiving a first request, wherein the first request is for filling in a form document, and wherein the first request comprises first contents;
  parsing the first contents of the first request to generate parsed information;
  based on the parsed information, determining whether the first contents comprise geographical location information of a user for whom the first request was sent;
  in response to determining that the first contents comprise the geographical location information of the user:
    determining, based on the geographical location information of the user, a particular service provider;
    based on the particular service provider, determining a particular service provider identifier that identifies the particular service provider;
    based on the particular service provider identifier, determining a form document identifier that identifies form document data which represents the form document that the particular service provider is using;
    based on the form document identifier:
      retrieving the form document data that represents the form document;

parsing the form document data of the form document to identify, in the form document data, one or more data information components;
wherein each data information component, of the one or more data information components identified in the form document data, comprises: a data text label, a data text field, and a data text field location,
  wherein the data text label, identified in the form document data, is depicted in the form document as adjacent to the data text field,
  wherein the data text field, identified in the form document data, is depicted in the form document at the data text field location,
  wherein the data text field location, identified in the form document data, indicates a location of the data text field on the form document, and
  wherein the data text field is labelled with the data text label and is to be filled with a text string;
identifying a first personal information database that contains first information for the user and that stores one or more first text strings in association with one or more first data text labels;
generating filled form document data of a filled form document by performing:
  for a data information component, of the one or more data information components of the form document, having a data text label, a data text field, and a data text field location:
    based on, at least in part, the data text label, determining whether the first personal information database contains the data text label and a data text string that is associated with the data text label, and if it does, retrieving, from the first personal information database, the data text string that is associated with the data text label; and inserting, in the filled form document, the data text string into the data text field, which is adjacent to the data text label of the data information component, at the data text field location;
  determining that one or more data text fields in the filled form document have not been filled in using information stored in the first personal information database; and
  in response to determining that the one or more data text fields in the filled form document have not been filled in using the information stored in the first personal information database:
    identifying one or more second data text labels that are associated with the one or more data text fields that have not been filled in the filled form document using the information stored in the first personal information database;
    identifying a second personal information database that contains second information for the user and that stores the one or more second data text labels and one or more second data text strings that are associated with the one or more second data text labels, and
    inserting, into the one or more data text fields in the filled form document, the one or more second text strings that are associated with the one or more second data text labels to complete filling in the filled form document;
wherein the method is performed by one or more computing devices.

16. The method of claim 15, further comprising:
determining whether the first contents comprise an entity identifier;
in response to determining that the first contents comprise the entity identifier:
  identifying a mapping between a plurality of entity identifiers and a plurality of form document identifiers;
  using the mapping, determining the form document identifier for the form document data;
  using the form document identifier, determining the form document identified by the form document identifier; and
  retrieving the form document data of the form document;
determining whether the first contents comprise the geographical location information;
in response to determining that the first contents comprise the geographical location information:
  identifying a mapping between the geographical location information and the plurality of form document identifiers;
  using the mapping, determining the form document identifier for the form document data;
  using the form document identifier, determining the form document identified by the form document identifier; and
  retrieving the form document data of the form document.

17. The method of claim 15, further comprising:
receiving a second request, wherein the second request is for entering personal information of a user;
parsing second contents of the second request;
determining whether the second contents comprise a user identifier;
in response to determining that the second contents comprise the user identifier:
  using the user identifier, identifying the personal information database identified by the user identifier;
  receiving the personal information from the user; and
  including the personal information in the personal information database;
determining whether the second contents comprise a personal database identifier;
in response to determining that the second contents comprise the personal database identifier:
  using the personal database identifier, identifying the personal information database identified by the personal database identifier;
  receiving the personal information from the user; and
  including the personal information in the personal information database.

18. The method of claim 15, wherein the database is implemented at one or more of:
a local database that is locally accessible to a cloud service;
a remote database that is remotely accessible to the cloud service;
a server database that is accessible to the cloud service via a server computer; or
a cloud system database that is accessible to the cloud service via a cloud service.

19. The method of claim 15, further comprising:
acquiring one or more user profiles created for a user of a cloud service;
parsing each of the one or more user profiles to determine a plurality of label-string pairs;

wherein each label-string pair, of the plurality of label-string pairs, comprises a pair text label and a pair text string;

determining whether any two label-string pairs, of the plurality of label-string pairs, comprise the same pair text label, but different pair text strings, and in response thereto, selecting one of the two label string pairs and deleting another label-string pair of the two label-string pairs; and storing, in the database, the remaining label-string pairs.

20. The method of claim 15, further comprising:

determining whether, for a particular data information component, of the one or more data information components, a particular data text label is stored in the database;

determining whether, for the particular data text label, a particular text string is stored in the database; and in response to determining that, for the particular data text label, no particular text string is stored in the database, generating and displaying a notification indicating that no particular text string is available for the particular data information component.

\* \* \* \* \*